US007301972B2

(12) United States Patent
Loewen et al.

(10) Patent No.: US 7,301,972 B2
(45) Date of Patent: Nov. 27, 2007

(54) APPARATUS, SYSTEM, AND METHOD FOR FREQUENCY STABILIZED MODE-LOCKED LASER

(75) Inventors: Roderick J. Loewen, Redwood City, CA (US); Ronald D. Ruth, Stanford, CA (US)

(73) Assignee: Lyncean Technologies, Inc., Palo Alto, CA (US)

( * ) Notice: Subject to any disclaimer, the term of this patent is extended or adjusted under 35 U.S.C. 154(b) by 122 days.

(21) Appl. No.: 11/102,473

(22) Filed: Apr. 8, 2005

(65) Prior Publication Data

US 2005/0254534 A1    Nov. 17, 2005

Related U.S. Application Data

(63) Continuation-in-part of application No. 11/077,524, filed on Mar. 9, 2005.

(60) Provisional application No. 60/560,848, filed on Apr. 9, 2004, provisional application No. 60/560,864, filed on Apr. 9, 2004, provisional application No. 60/561,014, filed on Apr. 9, 2004, provisional application No. 60/560,845, filed on Apr. 9, 2004, provisional application No. 60/560,849, filed on Apr. 9, 2004.

(51) Int. Cl.
*H01S 3/098* (2006.01)

(52) U.S. Cl. ............... 372/18; 372/28; 372/32

(58) Field of Classification Search .......... 372/28, 372/32, 18
See application file for complete search history.

(56) References Cited

U.S. PATENT DOCUMENTS

| 4,598,415 | A | 7/1986 | Luccio et al. |
|---|---|---|---|
| 5,247,562 | A | 9/1993 | Steinbach |
| 5,347,525 | A | 9/1994 | Faris |
| 5,353,291 | A | 10/1994 | Sprangle et al. |
| 5,485,164 | A | 1/1996 | Compton et al. |
| 5,796,506 | A | 8/1998 | Tsai |
| 5,835,199 | A | 11/1998 | Phillips et al. |
| 5,835,522 | A | 11/1998 | King et al. |
| 5,982,805 | A | 11/1999 | Kaneda |
| 6,035,015 | A | 3/2000 | Ruth et al. |
| 6,038,055 | A * | 3/2000 | Hansch et al. ............ 359/279 |
| 6,178,036 | B1 | 1/2001 | Yao |
| 6,226,354 | B1 | 5/2001 | Mamine |
| 6,459,766 | B1 | 10/2002 | Srinivasan-Raim Triveni |
| 6,487,003 | B1 | 11/2002 | Suzuki et al. |
| 6,763,042 | B2 | 7/2004 | Williams et al. |

(Continued)

OTHER PUBLICATIONS

S. Cundiff et al., "Colloquium: Femtosecond optical frequency combs," Reviews of Modern Physics, 75(1):325-42, Jan. 2003.

(Continued)

*Primary Examiner*—Dung (Michael) T. Nguyen
(74) *Attorney, Agent, or Firm*—Cooley Godward Kronish LLP

(57) ABSTRACT

A high finesse optical resonator is used to store optical pulses of a mode-locked laser. The mode-locked laser is frequency stabilized by monitoring an optical attribute of the high finesse optical resonator indicative of a difference between a center frequency of the mode-locked laser and a resonant frequency of the high finesse optical resonator. In one embodiment FM sideband modulation is used to stabilize the mode-locked laser pulses.

27 Claims, 22 Drawing Sheets

U.S. PATENT DOCUMENTS

| | | |
|---|---|---|
| 7,016,470 B2 | 3/2006 | Lawrence et al. |
| 2004/0017833 A1 | 1/2004 | Cundiff, et al. |
| 2005/0129178 A1* | 6/2005 | Pettit .......................... 378/122 |

OTHER PUBLICATIONS

S. Cundiff et al., "Phase stabilization of mode-locked lasers," Journal of Modern Optics, 52(2-3):201-219 Jan. 2005.

S. Cundiff. "Phase stabilization of ultrashort optical pulses," Journal of Physics D (Applied Physics), 35(8):R43-59 Apr. 2002.

R. Jones et al., "Precision stabilization of femtosecond lasers to high finesse optical cavities," Physical Review, A 69, 051803(R), 2004.

R. J. Loewen, "A Compact Light Source: Design and Technical Feasibility Study of a Laser-Electron Storage Ring X-Ray Source," PhD thesis, Stanford University, Stanford, CA, Jun. 2003.

* cited by examiner

APPARATUS, SYSTEM, AND METHOD FOR FREQUENCY STABILIZED MODE-LOCKED LASER

CROSS REFERENCE TO RELATED APPLICATIONS

This application is a continuation-in-part of application Ser. No. 11/077,524 filed on Mar. 9, 2005, entitled "Apparatus, System, and Method for High Flux, Compact Compton X-ray Source," which claims the benefit of the following provisional applications: application Ser. No. 60/560,848 filed on Apr. 9, 2004, application Ser. No. 60/560,864, filed on Apr. 9, 2004; application Ser. No. 60/561,014, filed on Apr. 9, 2004; application Ser. No. 60/560,845, filed on Apr. 9, 2004; and application Ser. No. 60/560,849, filed on Apr. 9, 2004, the contents of each of which are hereby incorporated by reference.

STATEMENT REGARDING FEDERALLY SPONSORED RESEARCH

This invention was supported in part by a grant from the National Institutes of General Medical Sciences, National Institutes of Health, Department of Health and Human Services, grant number 4 R44 GM066511-02. The U.S. Government may have rights in this invention.

FIELD OF THE INVENTION

The present invention is generally directed towards stabilizing the frequency of a mode-locked laser. More particularly, the present invention is directed towards stabilizing a mode-locked laser to facilitate optical coupling to an optical cavity.

BACKGROUND OF THE INVENTION

Synchrotron x-ray radiation sources are of interest for many different fields of science and technology. A synchrotron x-ray radiation source has a wavelength that is tunable. Intense x-ray beams with wavelengths matched to the atomic scale have opened new windows to the physical and biological world. Powerful techniques such as x-ray diffraction and scattering are further enhanced by the tunability of synchrotron radiation that can exploit the subtleties of x-ray spectroscopy.

High flux synchrotrons are typically implemented as centralized facilities that use large magnetic rings to store high-energy electron beams. As an illustrative example, a conventional third generation synchrotron may have a diameter of over 100 meters and utilize a 2-7 GeV beam, which combined with insertion devices such as undulator magnets generate 1 Angstrom wavelength x-ray radiation.

The large physical size, high cost, and complexity of conventional synchrotrons have limited their applications. For example, in many universities, hospitals, and research centers there are limitations on floor space, cost, power, and radiation levels that make a conventional synchrotron impractical as a local source of x-ray radiation. As a result, there are many medical and industrial applications that have been developed using synchrotron radiation that are not widely used because of the unavailability of a practical local source of synchrotron radiation having the necessary x-ray intensity and spectral properties.

Research in compact synchrotron x-ray sources has led to several design proposals for local x-ray sources that use the effect of Compton scattering. Compton scattering is a phenomenon of elastic scattering of photons and electrons. Since both the total energy and the momentum are conserved during the process, scattered photons with much higher energy (light with much shorter wavelength) can be obtained in this way.

One example of a Compton x-ray source is that described in U.S. Pat. No. 6,035,015, "Compton backscattered collimated x-ray source" by Ruth, et al., the contents of which are hereby incorporated by reference. FIG. 1 shows the system disclosed in U.S. Pat. No. 6,035,015. The x-ray source includes a compact electron storage ring 10 into which an electron bunch, injected by an electron injector 11, is introduced by a septum or kicker 13. The compact storage ring 10 includes c-shaped metal tubes 12, 15 facing each other to form gaps 14, 16. An essentially periodic sequence of identical FODO cells 18 surround the tubes 12, 15. As is well known, a FODO cell comprises a focusing quadrupole 21, followed by a dipole 22, followed by a defocusing quadrupole 23, then followed by another dipole 24. The magnets can be either permanent magnets (very compact, but fixed magnetic field) or electromagnetic in nature (field strength varies with external current). The FODO cells keep the electron bunch focused and bend the path so that the bunch travels around the compact storage ring and repetitively travels across the gap 16. As an electron bunch circulates in the ring and travels across a gap 16, it travels through an interaction region 26 where it interacts with a photon or laser pulse which travels along path 27 to generate x-rays 28 by Compton backscattering. The metal tubes may be evacuated or placed in a vacuum chamber.

In the prior art Compton x-ray source of U.S. Pat. No. 6,035,015 a pulsed laser 36 is injected into a Fabry-Perot optical resonator 32. The resonator may comprise highly reflecting mirrors 33 and 34 spaced to yield a resonator period with a pulsed laser 36 injecting photon pulses into the resonator. At steady state, the power level of the accumulated laser or photon pulse in the resonator can be maintained because any internal loss is compensated by the sequence of synchronized input laser pulses from laser 36. The laser pulse repetition rate is chosen to match the time it takes for the electron beam to circulate once around the ring and the time for the photon pulse to make one round trip in the optical resonator. The electron bunch and laser or photon pulses are synchronized so that the light beam pulses repeatedly collide with the electron beam at the interaction region 26.

Special bending and focusing magnets 41, 42, and 43, 44, are provided to steer the electron bunch for interaction with the photon pulse, and to transversely focus the electron beam inside the vacuum chamber in order to overlap the electron bunch with the focused waist of the laser beam pulse. The optical resonator is slightly tilted in order not to block the x-rays 28 in the forward direction, FIG. 1. The FODO cells 18 and the focusing and bending magnets 41, 42 and 43, 44 are slotted to permit bending and passage of the laser pulses and x-ray beam into and out of the interaction region 26. The electron beam energy and circulation frequency is maintained by a radio frequency (RF) accelerating cavity 46 as in a normal storage ring. In addition, the RF field serves as a focusing force in the longitudinal direction to confine the electron beam with a bunch length comparable to the laser pulse length.

In the prior art Compton x-ray source of U.S. Pat. No. 6,035,015 the electron energy is comparatively low, e.g., 8 MeV compared with 3 GeV electron energies in conventional large scale synchrotrons. In a storage ring with moderate energy, it is well-known that the Coulomb repulsion between the electrons constantly pushes the electrons apart in all degrees of freedom and also gives rise to the so-called intra-beam scattering effect in which electrons scatter off of each other. In prior art Compton x-ray sources the laser-electron interaction is used to cool and stabilize the electrons against intra-beam scattering. By inserting a tightly focused laser-electron interaction region 26 in the storage ring, each time the electrons lose energy to the scattered photons and are subsequently re-accelerated in the RF cavity they move closer in phase space (the space that includes information on both the position and the momentum of the electrons), i.e., the electron beam becomes "cooler" since the random thermal motion of the electrons within the beam is less. This laser cooling is more pronounced when the laser pulse inside the optical resonator is made more intense, and is used to counterbalance the natural quantum excitation and the strong intra-beam scattering effect when an intense electron beam is stored. Therefore, the electron beam can be stabilized by the repetitive laser-electron interactions, and the resulting x-ray flux is significantly enhanced.

Conventional Compton x-ray sources have several drawbacks that have heretofore made them impractical in many applications. In particular, prior art compact Compton x-ray sources, such as that described in U.S. Pat. No. 6,035,015, are not sufficiently bright x-ray sources for narrowband applications, such as protein crystallography or phase contrast imaging. Narrowband applications (also known as "monochromatic" applications), are applications or techniques that commonly use a monochromater to filter or select a narrow band of x-ray energies from an incident x-ray beam. As an illustrative example, monochromators typically select less than 0.1% of the relative energy bandwidth. As a result, narrowband applications not only benefit from a source with a high total x-ray source but an x-ray flux that is comparatively bright within a narrow bandwidth.

The x-ray beam of prior art Compton x-ray sources, such as that described in U.S. Pat. No. 6,035,015, has a lower brightness than desired due in part to the large energy spread caused by the electron-laser interaction. The brightness is also less than desired because the optical power level that can be coupled into and stored in the Fabry-Perot cavity between mirrors 33 and 34 for use in Compton backscattering is less than desired, due to a number of limitations on the control, stability, and losses in different elements of the optics system. Additionally, U.S. Pat. No. 6,035,015 has the optical mirror 34 offset from the path of the x-rays to reduce x-ray absorption, resulting in the optical beam being a few degrees off from a true 180 degree backscattering geometry, which significantly reduces Compton backscattering efficiency.

Therefore, what is desired is a compact Compton x-ray source with increased brightness and efficiency that is suitable for narrowband synchrotron radiation applications.

SUMMARY OF THE INVENTION

A high finesse optical resonator is used to store optical pulses of a mode-locked laser for use in a Compton backscattering x-ray system. The mode-locked laser is frequency stabilized by monitoring an optical attribute of the high finesse optical resonator indicative of a difference between a center frequency of the mode-locked laser and a resonant frequency of the high finesse optical resonator. In one embodiment a FM sideband modulation is used to stabilize the mode-locked laser pulses.

One embodiment of an apparatus for storing optical pulses in an optical resonator as a superposition of pulses comprises: a mode-locked laser generating optical pulses comprising a comb of frequencies within a frequency range, the mode-locked laser having a selectable center frequency of the optical pulses; an FM sideband modulator receiving the optical pulses and generating input pulses for the optical resonator having an FM sideband frequency relative to the center frequency; a detector for receiving reflected laser light at the FM sideband frequency and stored light exiting the optical resonator at a cavity frequency; and a controller monitoring deviations of the center frequency from a resonant frequency of the optical resonator and in response adjusting the center frequency to match the resonant frequency within a selected margin less than a cavity bandwidth of the optical resonator.

One embodiment of system for storing optical pulses for use in a Compton backscattering system, comprises: a high finesse optical resonator for storing optical pulses and increasing pulse power via resonant superposition of optical pulses within the high finesse optical resonator; a mode-locked laser generating a train of optical pulses coupled to the high finesse optical resonator, the train of optical pulses having a repetition rate, center frequency, and a comb of frequencies; and a control system monitoring an optical attribute of the optical resonator indicative of a difference between the center frequency and a resonant frequency of the high finesse optical resonator, the control system regulating the center frequency to be within a cavity bandwidth of the high finesse optical resonator.

One embodiment of a method of generating optical pulses for a Compton backscattering x-ray system, comprises: providing a mode-locked laser for coupling optical pulses into a high finesse optical resonator; monitoring an optical attribute of the high finesse optical resonator indicative of a difference between a mode-locked laser center frequency and a resonant frequency of the high finesse optical resonator; and adjusting the center frequency of the mode-locked laser to be within a cavity bandwidth of the resonant frequency.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 2:
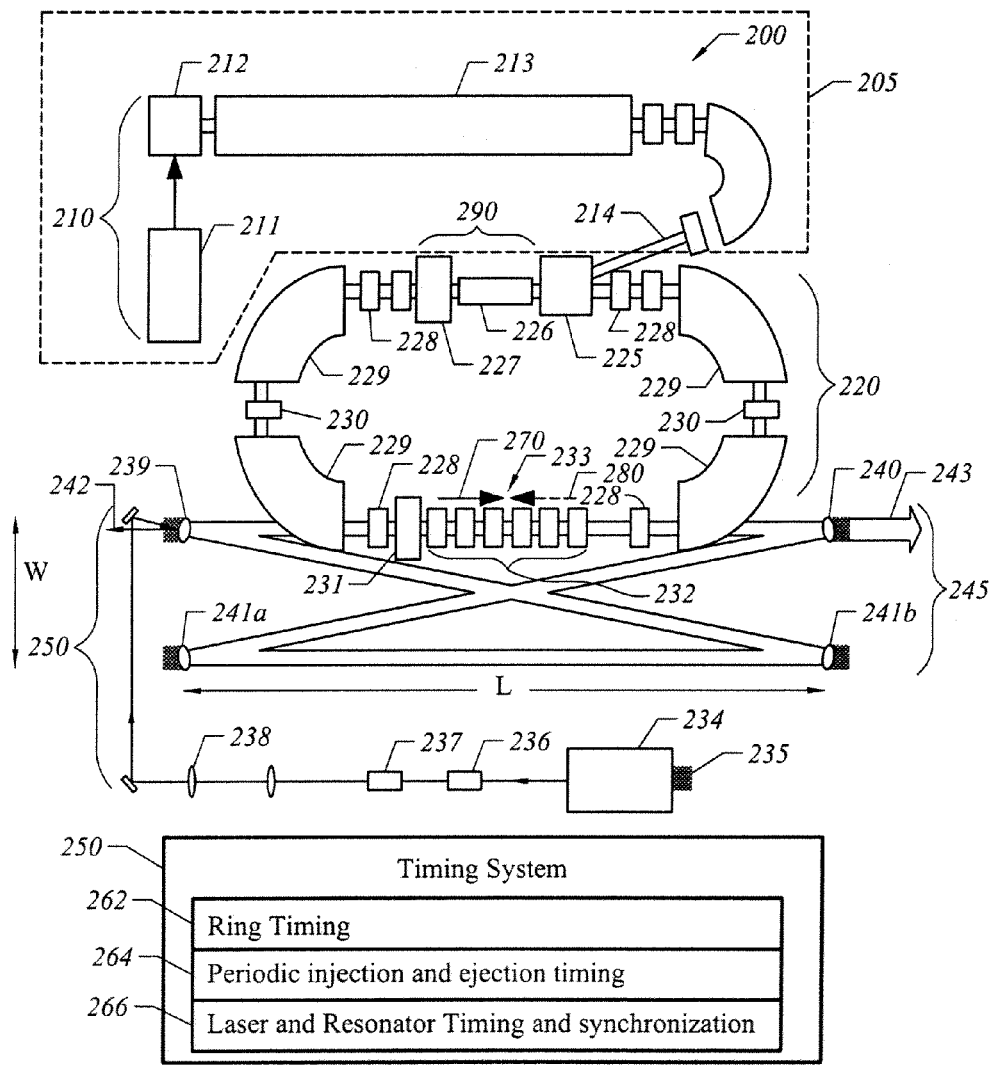
FIG. 2 is a block diagram of a Compton x-ray source in accordance with one embodiment of the present invention.

FIG. 2 illustrates a compact x-ray synchrotron source 200 having features facilitating the generation of nearly monochromatic, collimated, tunable, high-flux beam of x-rays suitable for many x-ray applications in accordance with one embodiment of the present invention.

X-ray synchrotron source 200 includes an injector 205 portion of the system having elements 211, 212, 213, and 214 for generating and injecting an electron bunch into an electron storage ring 220 via septum 225. An electron bunch is a group of electrons that, for example, has a spatial density envelope, energy and momentum distribution, and temporal pulse length. An electron source 210 produces an electron bunch using an RF gun 212 by striking a photocathode material, such as copper or magnesium, with a pulsed laser 211. A short linear accelerator section(s) 213 accelerates the electron beam to the full energy desired in the ring to obtain a desired x-ray energy for Compton scattering at approximately 180 degrees with photons having a selected wavelength. For example, the electron energy necessary for 1 Å radiation, using a 1 µm wavelength laser pulse, is 25 MeV.

A transport line 214 consisting of focusing and steering magnets prepares the electron bunch for injection into the electron storage ring 220.

An injected electron bunch is steered using a septum magnet 225 near the closed orbit trajectory of the electron storage ring 220. The bunch trajectory is then aligned to the proper storage ring orbit by a fast deflector magnet (kicker) 226. In one embodiment kicker 226 uses a compact set of distributed deflector magnets to reduce the peak power, and hence complexity, of the drive electronics.

An ejector 290 portion of the system includes kicker 226 and shielded beam dump 227. Kicker 226 ejects an existing, circulating pulse to locally shielded beam dump 227. The locally shielded electron dump 227 provides a controlled means to minimize unwanted radiation emission. In one embodiment locally shielded electron dump 227 includes a collimator or aperture at the entrance of the dump to intercept an ejected electron bunch. Each dump (ejection) of an electron bunch generates radiation that, if unshielded, would raise background radiation levels in the region around x-ray synchrotron source 200. Radiation shielding (not shown) associated with locally shielded electron dump 227 is sized and located to reduce background radiation levels. As described below in more detail, septum 225, kicker 226, and shielded beam dump 227 are preferably designed to permit a mode of operation in which the electron bunch is regularly (e.g., periodically) refreshed (e.g., simultaneous injection of a new electron bunch and ejection of an old electron bunch) in order to reduce the time-averaged energy and momentum spread of the electron bunch compared with steady-state operation. Localized radiation shielding of shielded beam dump 227 is thus desirable to facilitate regular refreshment of the electron bunch while maintaining acceptable average background radiation levels.

The electron storage ring 220 includes focusing and steering elements for guiding and maintaining an electron bunch in a stable, closed orbit. A magnet lattice composed of quadrupole focusing magnets 228 and dipole bending magnets 229 contain and steer the beam in a closed-loop orbit. The dipole magnets, together with intervening quadrupole magnet(s) 230 may form achromatic optical systems to facilitate injection and beam optics matching.

The beam is kept tightly bunched by an RF cavity 231. On one side of the ring is a straight section in which the electron beam is transversely focused to a small spot by a set of quadrupole magnets 232. This small spot is called the interaction point (IP) 233 (also sometimes known as the "interaction region") and is coincident with the path of a focused laser pulse created by optics system 250. The beam dynamics of the electron bunches are preferably optimized to achieve a stable orbit with acceptable degradation. Beam position monitors may be included to monitor the beam trajectory of electron bunches along the ring.

Optics system 250 generates photons that collide with electrons in the interaction point 233. In one embodiment, photons collide with electrons in a 180 degree backscattering geometry. A pulsed laser source 234 drives an optical resonator 245 formed by the optical cavity associated with mirrors 239, 240, 241a, and 241b. The optical resonator 245 has an optical path between mirrors 242 and 240 that is coaxial with a portion of the storage ring 220 through the interaction point 233. The pulsed laser source 234 includes elements needed to condition the laser for coupling power efficiently to optical resonator 245. A feedback system may consist of a local controller 235, such as a high bandwidth piezo-electric mirror assembly, to track the laser frequency to that of the optical resonator 245. Such systems may use an optical modulator 236 to implement a frequency discrimination technique that produces an appropriate error signal from a reflected signal 242.

An input mirror 239 is made purposely transmissive to enable optical power to enter the cavity from the drive laser 234. The input transmission value should be ideally matched to the total internal cavity losses in order to efficiently couple power (impedance matched). The cavity mirrors are curved with values appropriate to produce a small spot of similar size to the focused electron beam at the IP 233.

The optical resonator 245 may be a conventional cavity, such as a Fabry-Perot cavity. However, in one embodiment the optical resonator 245 is a ring cavity. Additional optical elements (not shown) may be used to adjust the position of one or more of the mirrors 242, 240, 241a, and 241b.

In one embodiment mirrors 239, 240, 241a, 241b are configured to form a 'bowtie' ring cavity as shown. The bowtie configuration is a traveling wave ring, which has increased stability over a standing wave Fabry-Perot optical cavity. Note that in a bowtie configuration that there are two (phase/time shifted) pulses that are simultaneously circulated in resonator 245. If a bowtie configuration is used, x-ray system 200 is preferably designed to synchronize the collision of each of the two circulating phase/time shifted photon pulses with the electron bunch.

An optical resonator 245 including a bowtie ring cavity affords several advantages. The geometry of a bowtie cavity permits a long separation, L, between mirrors 239, 240 within a reasonable total area. This is due, in part, to the fact that the bowtie configuration permits the width, W, between mirrors 239 and 241a to be less than the length, L, separating mirrors 239 and 240, particularly if the angular deflection provided by each mirror is selected to be comparatively small. A long separation, L, facilitates shaping photon pulses to have a narrow waist near IP 233 that increases at mirrors 239 and 240. The long separation, L, facilitates selecting the optical elements to form a narrow optical waist at interaction point 233 where the opposing electron beam is likewise transversely focused. Additionally, because the two mirrors 239, 240 on each side of the waist can be separated by a large distance, L, in a bowtie configuration, the bowtie configuration permits a substantial increase in the beam size on these mirrors that in turn lowers the optical power per unit area or risk of damage. That is, a long distance between mirrors 239, 240 permits a narrow optical waist at interaction point 233 and a comparatively wide optical profile at mirrors 239, 240. In one embodiment, the ratio of transverse beam size between the mirrors and the waist is approximately 100:1 which leads to a reduction in power density at mirrors 239, 240 on the order of 10000:1 for an axially symmetric TEM00 mode. Since one limiting factor on the circulating power in optical resonator 245 is mirror damage, the reduction in power levels at the mirror facilitates storing a high optical power level within optical resonator 245.

A large distance between mirrors 239, 240 is also advantageous to steer an electron beam in to and out of the IP using dipole magnets 229 such that the collision may occur at an optimal 180 degree backscattered geometry. A very small or zero crossing angle between electron and photon pulses maintains a high interaction efficiency yet allows the pulses to remain relatively long for improved stability. A natural consequence of this 180 degree backscattering geometry is that generated x-rays will follow a path coincident with the electron path trajectory at the IP 233 and consequently be directed toward and through one optical mirror 240.

Using high-quality spherical mirrors in such geometries may require a local controller (not shown) to adjust astigmatism on a subset of mirrors to guarantee small interaction spots in both transverse dimensions at the IP 233. Another local control on the overall cavity length, for instance with a set of piezo-electric elements on one mirror (not shown), is required to set the cavity round-trip time (or path length) to be harmonically related to the round-trip time (path length) of the electrons in the ring in order to properly synchronize collisions.

A polarization controller 237 may be included to rapidly change the optical polarization properties of the optical pulse, which in turn affects the polarization of generated x-rays. Such a controller may be implemented using an electrical Pockels cell or mechanically controlled waveplates.

Matching optics 238 manipulate the transverse mode profile to match the eigenmode of the cavity. Flat turn mirrors may also be included to align the incident beam to the optical cavity axis. The matching optics are illustrated as transmissive lenses, although for high power applications, using all reflective optics may be preferred to preserve optical mode quality.

In one embodiment optical resonator 245 is a high-finesse cavity and pulsed laser source 234 is a frequency stabilized mode-locked laser that resonantly drives the high-finesse cavity of optical resonator 245. In one embodiment the pulsed laser source 234 is a mode locked laser that is actively stabilized to efficiently drive a high-finesse external resonator 245. The mode-locked laser system resonantly drives the enhancement cavity to build-up a high power laser pulse. The laser tracks the resonance of the optical cavity through active feedback, such as deriving an error signal by measuring the phase of the prompt reflection to that of some small leaked cavity power 242. A photodiode or other high bandwidth detector (not shown) may be used on the reflected signal 242 from the cavity for feedback or wavefront diagnostics.

An optical resonator 245 formed from a high finesse cavity is capable of storing large photon densities. The optical cavity gain and power storage performance has an intrinsic limit given by the total losses of the cavity and mirror power handling. Advances in optical coatings have pushed mirror scatter and absorption losses down to part per million levels. These low losses together with higher surface damage thresholds are compatible with an average circulating power on the order of a megawatt or more using commercially available solid-state laser power. However, a high finesse cavity has a narrow bandwidth, which means that high optical power levels within a high finesse cavity can only be efficiently achieved if pulsed laser source 234 is a frequency stabilized laser source, such as a mode-locked laser, with a narrow, controlled bandwidth that is matched to the high finesse cavity. As one example, the combination of a frequency stabilized mode locked laser and a high finesse cavity permits a pulsed gain enhancement in excess of 10,000, which reduces the laser source complexity and cost needed for a Compton scattering x-ray source due to the increase in optical power level.

Figure 1:
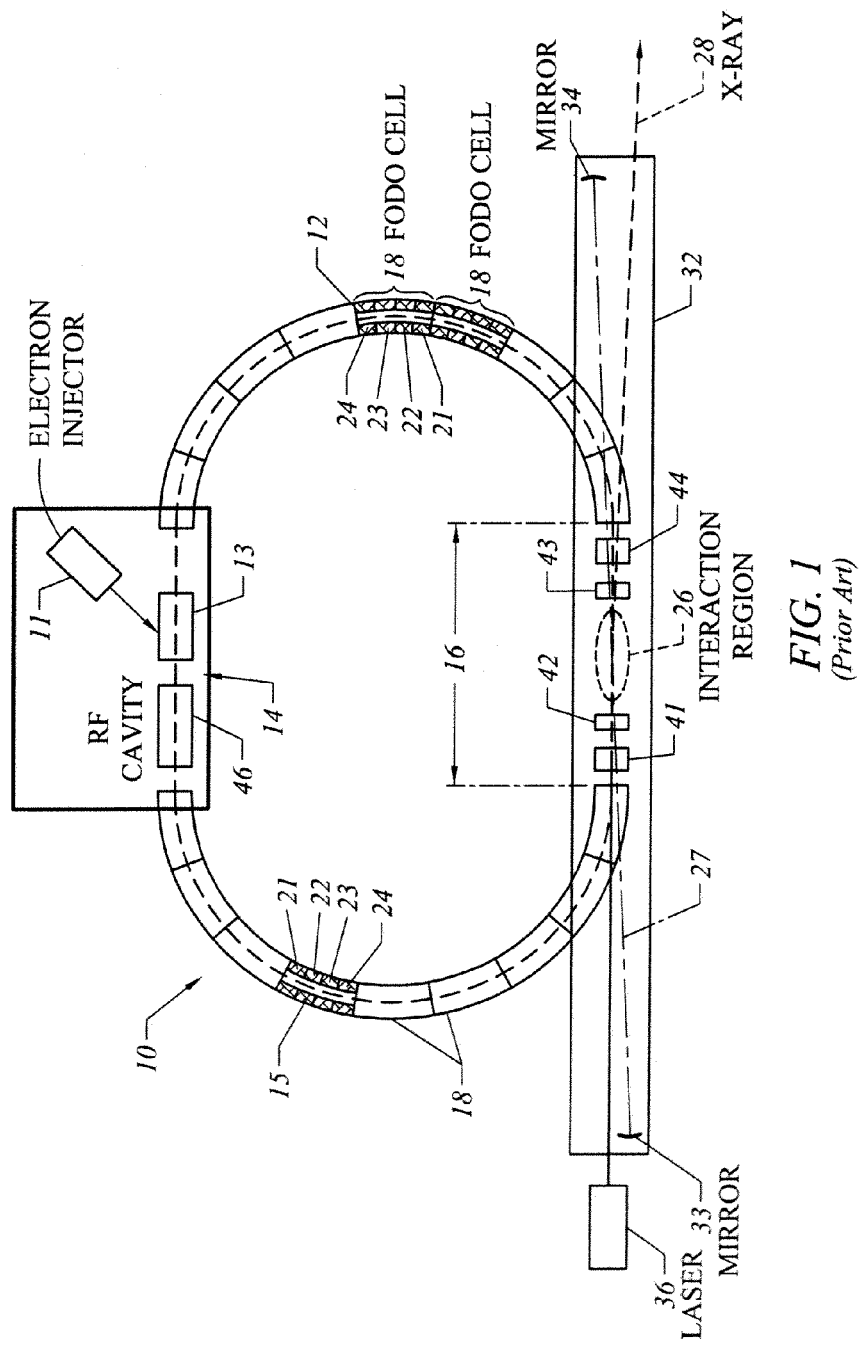
FIG. 1 is a block diagram of a prior art Compton x-ray source.

In the backscattering geometry illustrated in FIG. 2 an electron bunch 270 and a photon pulse 280 interact at interaction point 233 and generate x-rays 243 that pass through mirror 240. The efficiency of the Compton backscattering process is improved for a true 180 degree backscattering process compared with the off-axis geometry illustrated in prior art FIG. 1. However, a conventional laser mirror 240 adds a substantial x-ray attenuation. A 180 degree backscattering geometry thus provides a net increase in x-ray brightness only if the x-ray attenuation of mirror 240 is sufficiently low. Optical mirror 240 is thus preferably low loss for photon pulses and also transmissive for x-rays. For example, mirror 240 may be a high quality optical mirror formed from a multi-layer dielectric reflective stack deposited on a substrate. The dielectric layers and the substrate are preferably selected to transmit, with little attenuation, hard x-rays with energies $\geqq 5$ keV. For example, optical mirrors made from Tantalum ($Ta_2O_5/SiO_2$) or Zirconium ($ZrO_2/SiO_2$) dielectric layers contain absorption energies in the hard x-ray spectrum although the overall attenuation due to the coatings should preferably not exceed ~10% for multi-layer stack mirrors. A preferred combination of dielectric coating materials for a dielectric stack is alternating layers of Titania/Silica ($TiO_2/SiO_2$). The K-edge is at 5 keV, which makes the x-ray transmission efficient for ~7 keV and higher x-ray energies. Another possible combination of dielectric materials for >1 μm wave-length is Silicon/Silica ($Si/SiO_2$). Exemplary substrate materials include Beryllium, Silicon, and Sapphire. Another possible substrate is to coat a super-polishable (~1 Å rms) substrate, preferably Silicon, with CVD diamond to improve mechanical rigidity and thermal conductivity.

A timing system 260 synchronizes the timing of different components. Ring timing 262 generates signals for controlling the ring orbit frequency for electron bunches. Injection and ejection timing 264 generates signals for controlling the injection of new electron bunches and the simultaneous ejection of old electron bunches. The refreshment of the electron bunches is preferably performed periodically according to a selected period (e.g., at a rate of 10 to 200 Hz). Periodic refreshment has the benefit over other scheduling protocols that it facilitates synchronization. However, it will be understood that injection and ejection timing 264 may define a refreshment schedule other than that of a fixed period. Laser and resonator timing synchronization 266 generates timing signals for synchronizing optical system 250 to the electron bunches.

Figure 3:
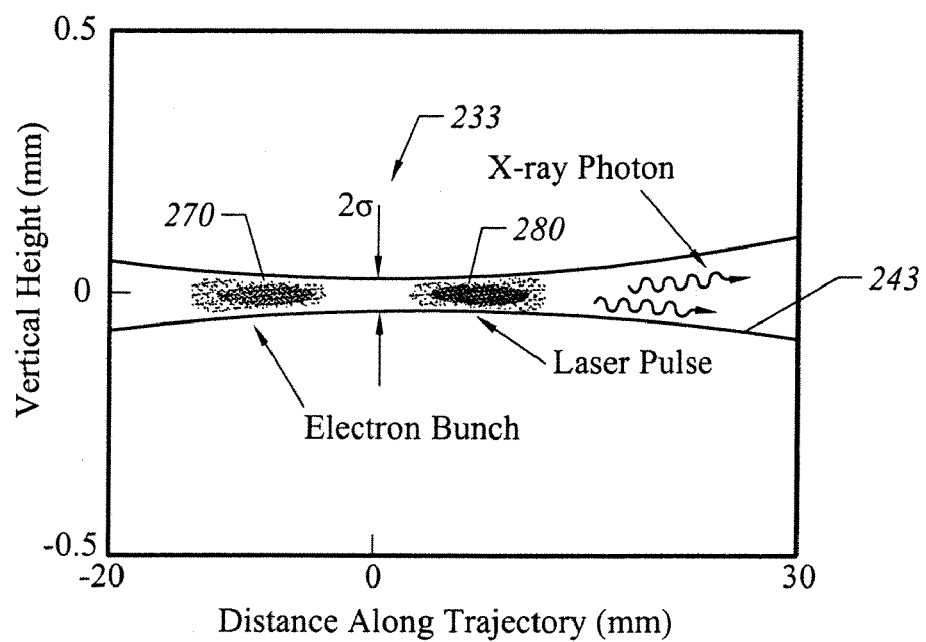
FIG. 3 illustrates the electron-photon interaction at the interaction point.

FIG. 3 illustrates the backscatter geometry near the interaction point 233. The electron bunch 270 and the laser (photon) pulse 280 have a vertical height (i.e., radial profile) across the length of an electron bunch 270. Focusing elements within storage ring 220 focus the electron bunch 270 whereas optical elements focus the laser pulse 280. At the interaction point 233 the electron bunch and the laser pulse preferably a similar radial waist radius, σ, although to generate particular x-ray beam qualities the beam waists may be selected to be purposely different. The electron bunch 270 and the laser pulse 280 travel in opposite directions towards the interaction point 233 and produce a burst of x-rays 243 as their envelopes pass through each other. Fundamental principles of electron focusing and optical focusing may be used to calculate the three-dimensional profile of the electron bunch 270 and the laser pulse 280. The electron bunch and the laser pulse are preferably formed and focused to have similar profiles and temporal lengths selected to optimize Compton backscattering. Note that the radial diameter of an electron bunch or a photon pulse increases along its length due to fundamental principles of electron and optical focusing. Generally, increasing the temporal length of an electron bunch or a photon pulse increases the radial spread. A substantial increase in radial diameter can reduce the average brightness of the x-ray source. As described below in more detail, it is desirable to select the temporal length of the electron bunch and the laser pulse such that each pulse length results in expansion that is less than the Rayleigh range, or depth of focus.

The repetition rate for collisions is determined by the ring geometry. For example, a 4 meter circumference would give an interaction rate of 75 MHz corresponding to the inverse of the time it takes for an electron bunch to make one revolution around the ring. The x-rays are directed in a narrow cone in the direction of the electron beam. They can be focused using conventional x-ray optics down to the source image size, for instance ~60 μm diameter. Gross x-ray energy can be tuned by adjusting the electron beam energy, and fine-tuning can be accomplished by a monochromator crystal or filter adjustment.

The general configuration as described above operates with a similar photon flux up to x-ray energies of many tens of keV, and can be scaled to gamma ray energies as well.

As previously described, in one embodiment the injector 205 and ejector 290 regularly refreshes the electron bunch in the storage ring to improve the beam quality. For example, in a periodic refreshment process, after an electron bunch has completed a pre-selected number of trips around the ring (e.g., one million turns) the "old" electron bunch is ejected and a "new" electron bunch is injected to take its place. In the example of a system having an interaction rate of 75 MHz, refreshing at a rate of 60 Hz would permit each electron bunch to make 1.25 million turns before being ejected. Note that this mode of operation is in contrast to conventional synchrotron operation in which the synchrotron is traditionally operated in a steady-state mode as long as practical for beam stability and other considerations.

Figure 4A:
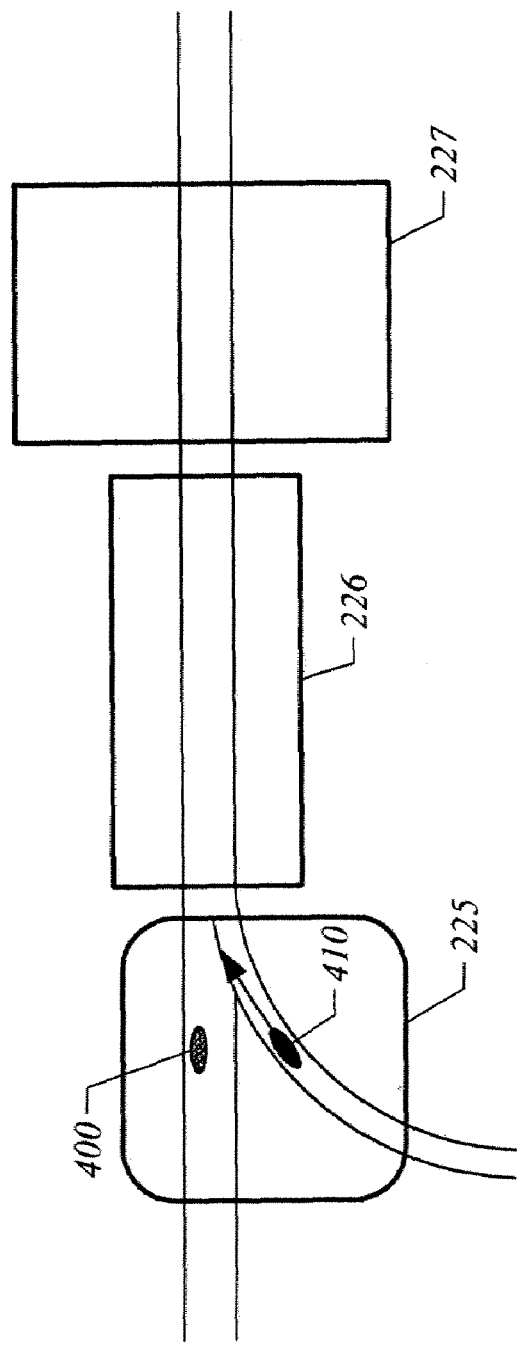
FIG. 4A illustrates a portion of an ejection/injection cycle in which a new electron bunch is injected.
Figure 4B:
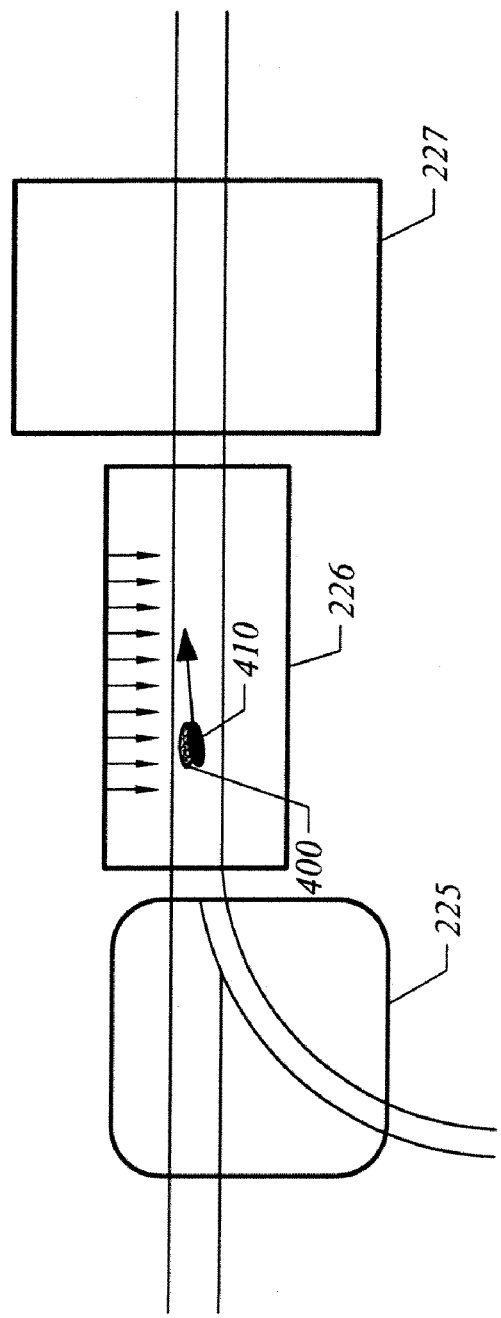
FIG. 4B illustrates a portion of an ejection/injection cycle in which the new electron bunch and the old electron bunch are being deflected by the kicker.
Figure 4C:
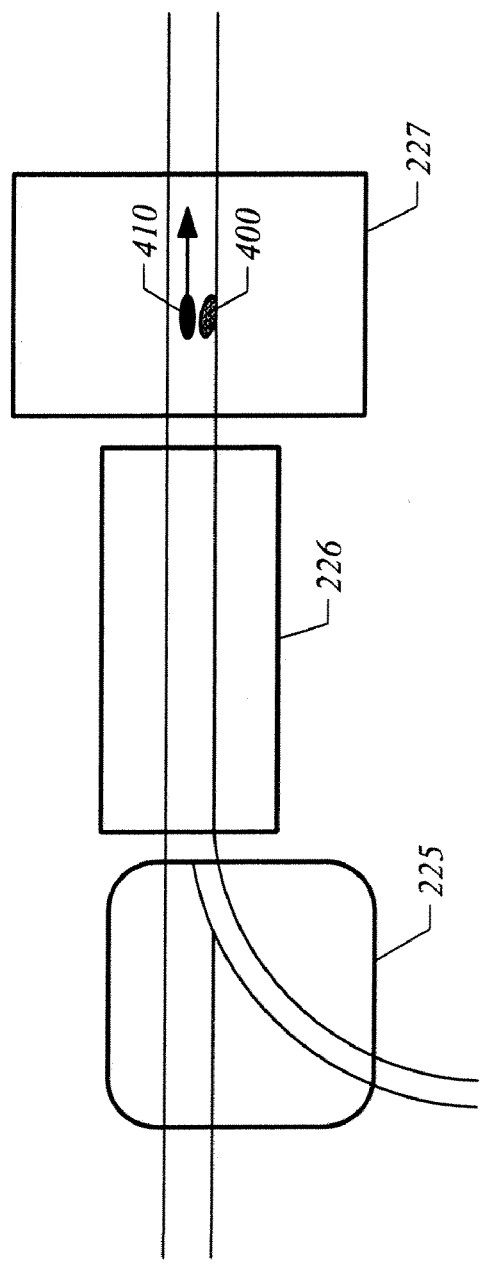
FIG. 4C illustrates a portion of an ejection/injection cycle in which the old electron bunch has been dumped and the new injection bunch has been directed into an orbit in the electron storage ring to replace the old electron bunch.

FIGS. 4A-4C illustrate aspects of a refreshment process in which an old electron bunch is ejected while a new electron bunch is simultaneously injected. Referring to FIG. 4A, an electron bunch 400 that has completed a pre-selected number of turns enters septum 225. A new electron bunch 410 is synchronized to enter kicker 226 at a time selected such that the new electron bunch 410 will replace the old electron bunch 400. Referring to FIG. 4B, kicker 226 is turned on during the refresh process to apply a magnetic field that shifts the path of an electron bunch within kicker 226. Note that the two electron bunches 400 and 410 have slightly different initial trajectories. Both the old electron bunch 400 and the new electron bunch 410 are spatially shifted by the magnetic field applied by kicker 226. Referring to FIG. 4C, kicker 226 applies a sufficient magnetic field to shift new electron bunch 410 into a proper trajectory to enter a stable orbit in electron storage ring 220 as the new stored electron bunch. Conversely, old electron bunch 400 has its trajectory shifted to exit the electron storage ring 220 in dump 227. Kicker 226 is then turned off until the next refresh cycle.

When a new electron bunch 410 is first injected into the electron storage ring 220, it has a comparatively narrow energy and momentum spread and can be tightly focused. However, with each subsequent revolution around the ring attributes of the electron bunch affecting x-ray emission degrade according to a time response. In particular, the energy and momentum of the electron bunch may increase to equilibrium levels for times greater than a degradation time (e.g., a degradation time may correspond to an exponential time constant to approach $e^{-1}$ of a final saturation value). For example, the time response for intra-beam scattering (with radiation damping) is a response in which the intra-beam scattering begins at some initial rate of increase with the rate of increase exponentially decaying over time until the intra-beam scattering reaches a saturation level for time periods sufficiently long, e.g., for times greater than some saturation time constant. Additionally, any other degradation mode that may exist in the system would be expected to have its own associated time response and degradation time constant. However, in many applications, intra-beam scattering is expected to be the dominant degradation mechanism. Intra-beam electron beam scattering increases with each revolution and eventually reaches a saturation level through photon cooling (e.g., radiation damping) over a time scale that is commonly on the order of a fraction of a second, as described in more detail in R. J. Loewen. *A Compact Light Source: Design and Technical Feasibility Study of a Laser-Electron Storage Ring X-Ray Source.* PhD thesis, Stanford University, Stanford, Calif., June 2003, the entire contents of which are hereby incorporated by reference.

Intra-beam scattering increases the transverse emittance (the product of the spot size and the angular divergence) and also the longitudinal emittance (the product of the bunch length and energy spread). An increase in transverse emittance is undesirable because an increased transverse emittance reduces the x-ray brightness. This is because the transverse emittance is inversely proportional to the output x-ray quality or brightness, where the brightness can be expressed mathematically in terms of photons, area, solid angle (solidangle), and bandwidth as brightness=photons/(area*solidangle*bandwidth). An increase in longitudinal emittance (energy spread) increases the bandwidth of the x-rays, which is undesirable for narrowband applications because it means that the usable flux within a desired "monochromatic" bandwidth is decreased. As an illustrative example, in the prior art system of FIG. 1, the equilibrium value of intra-beam scattering and quantum excitation lead to an order of magnitude increase in energy spread, and commensurate reduction in brightness, from the initial injected electron beam parameters.

Selecting the refresh rate to increase x-ray brightness involves a tradeoff between several different considerations. The upper limit on refresh rate is limited by system considerations such as electron bunch injection power, design complexity, synchronization issues, and shielding concerns (since each beam dump will generate undesirable radiation). The lower limit on refresh rate is bounded by the desire to operate in a transient mode in which time-averaged x-ray brightness (within a selected bandwidth) is improved compared with steady state operation. In particular, the minimum refresh rate may be selected such that the period of the rate is less than the time for the electron bunch to degrade to a steady-state saturation level. For example, the minimum refresh rate may be selected to be less than a degradation time constant for degrading to the steady state. As a result, the time-averaged electron bunch attributes improve, resulting in a corresponding improvement in the time-averaged x-ray attributes.

As an illustrative example, for a particular application the minimum refresh rate may be selected to achieve a desired increase in the level of x-ray brightness within a desired bandwidth compared with operating in steady-state. As one example, a simulation by one of the inventors of the present application indicates that the energy and momentum of an electron bunch may approximately double over a time scale of 0.01 seconds. Over a longer period of time (e.g., a significant fraction of a second), steady state is reached with a decrease in brightness of about an order of magnitude. Thus, in one embodiment the refresh rate is selected to maintain the degradation below a pre-selected level, such as a factor of two or three increase in degradation. Consequently, periodically refreshing the electron bunch at a fraction of the dominant time constant, such as at rates greater than about 10 Hz (e.g., 10 to 200 Hz) is sufficient to operate in a transient (non-steady state) mode that improves x-ray brightness and reduces the bandwidth of the x-rays. Thus, in this illustrative example it can be understood that dramatic increases in brightness can be achieved by periodically refreshing the electron bunch. Although the improvement in brightness is useful for a variety of applications, the corresponding reduction in bandwidth of emitted x-rays also makes periodic refreshment of particular interest for narrowband synchrotron x-ray application where the x-ray source must have a high flux within a comparatively narrow bandwidth.

While the electron bunch may be refreshed at a fixed rate, more generally the electron bunch may be refreshed according to a schedule. For example, the schedule may include a fixed rate of refreshment, a variable rate of refreshment, an adjustable rate of refreshment, or other scheduling schemes. However, in many applications a fixed refresh rate is the simplest schedule to implement using commercially available electronics.

Regularly refreshing the electron bunch also provides other benefits to system design of a compact Compton x-ray source. In particular, the number of components is reduced compared with a steady-state design. For example, a steady-state design conventionally includes components to stabilize the beam over long time periods (e.g., hours or days), which increases the number of components that are required. For example, a conventional compact Compton x-ray source designed to operate in steady state for extended time periods must include components to stabilize the large equilibrium energy spread of the beam, such as through chromaticity correction or a low momentum compaction lattice.

Figure 5A:
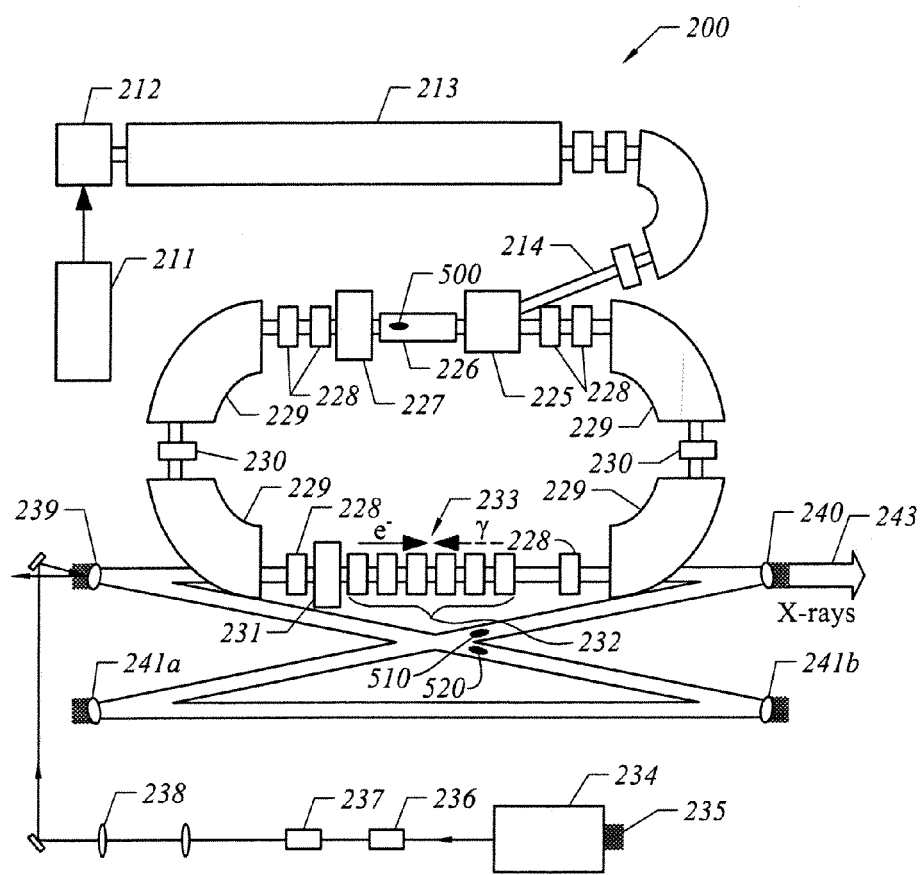
FIG. 5A illustrates the location of the electron bunch and the photon pulse at a first time.
Figure 5B:
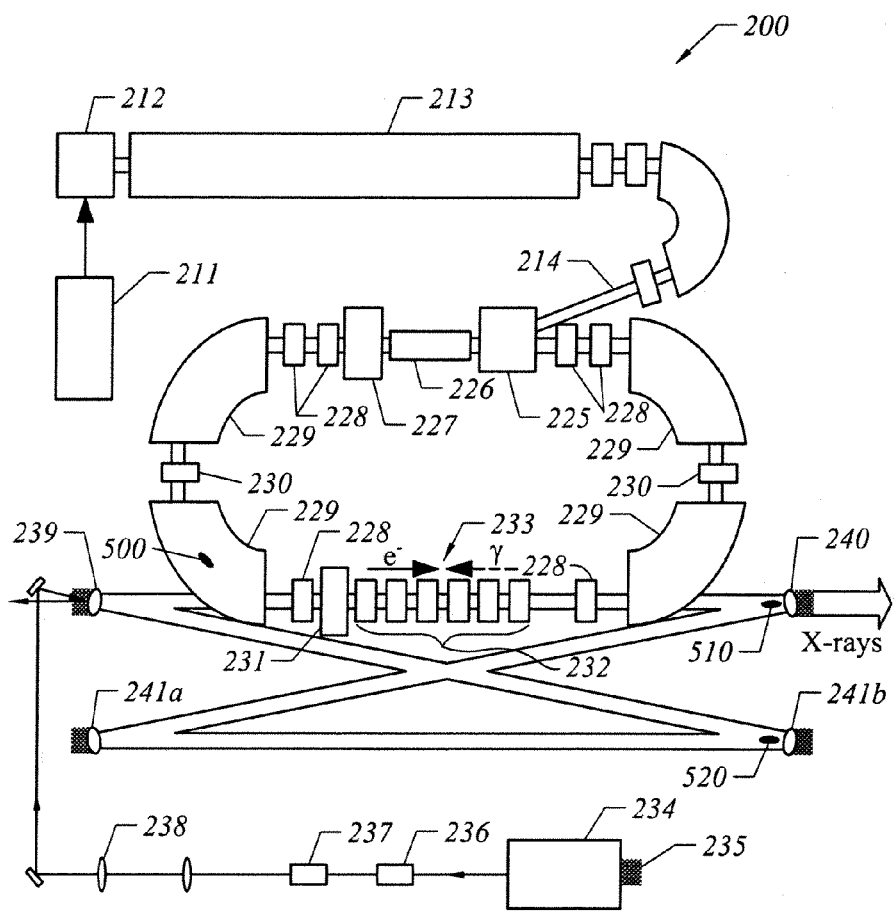
FIG. 5B illustrates the location of the electron bunch and the photon pulse at a second time.
Figure 5C:
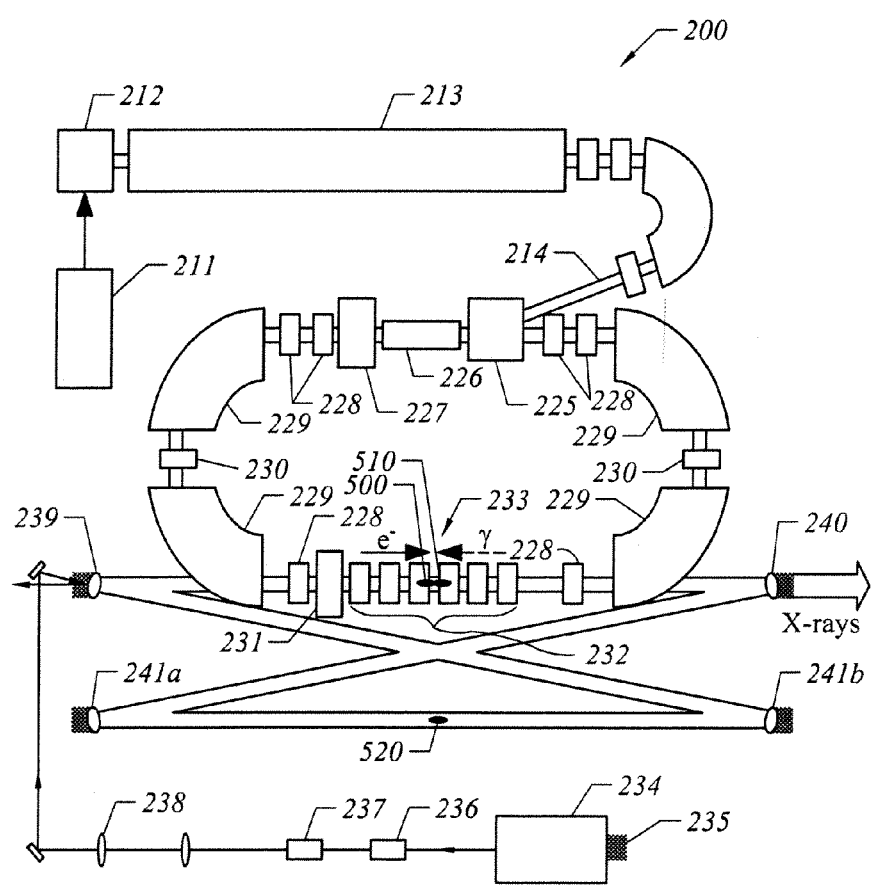
FIG. 5C illustrates the location of the electron bunch and the photon pulse at a third time.

FIGS. 5A-5C are illustrations at three different times illustrating how the electron bunch and optical pulse are timed to meet at the IP 233. As shown in FIG. 5A, at some initial time, an electron bunch 500 traverses the kicker 226. In the optical cavity, a first optical pulse 510 is directed towards mirror 240. A second optical pulse 520 is directed towards mirror 241b. As shown in FIG. 5B, at a second time, the electron bunch 500 has moved partially towards the IP while the first optical pulse 510 strikes mirror 240 and the second optical pulse 520 strikes mirror 241b. As illustrated in FIG. 5C, at a third time, the electron bunch 500 and optical pulse 510 are directed in opposite directions and interact at the IP 233.

Referring again to FIG. 2, in one embodiment timing system 260 adjusts ring timing 262, periodic injection and ejection timing 264, and laser and resonator timing and synchronization 266. A preferred embodiment employs a set of master frequency sources that are phase-locked to high precision and distributed to the device subsystems, thus circumventing complicated or costly timing feedback systems. In one embodiment, an integrated master frequency generator internally phase locks to each of the required frequencies using phase locked coaxial resonator oscillators. In one embodiment a base frequency F1 (~100 MHz) represents the electron ring circulation time and interaction rate. An RF frequency at some multiple of that rate $F2=n*F1$ (e.g. n=16) is fed to one or more RF cavities in the electron storage ring 220 to stabilize longitudinal dynamics. Furthermore, another harmonic multiple of the ring frequency $F3=m*F1$ (e.g. m=30) may be used to power the RF gun 212 and accelerating structures. The particular choice of frequencies depends on source costs and desired beam parameters. In one embodiment a high-power S-band (~3 GHz) pulsed microwave source is used to power the injector system, and then derive suitable ring circulation frequencies from sub-harmonics.

Timing system 260 coordinates the electron bunch injection and ejection cycles to maintain electron bunches in the storage ring within acceptable design parameters for absolute timing, energy spread and bunch length. The injection/ejection cycle is preferably performed at some integer multiple of the AC line frequency in order to reduce pulse-to-pulse timing (phase) jitter generated from high power RF systems. These timing pulses are generated, for example, from a fast 60 Hz zero-crossing detector logically 'AND'ed with the desired ring circulation frequency F1. The pulsed injector system may, for example, operate in the 10 to 200 Hz frequency range ("re-injection" rate).

The photocathode of RF gun 212 requires phase stability between the RF powering the device (F3) and the timing or phase of the incident laser 211 used to create the electron bunch (F1). Laser pulses derived from a mode-locked laser 234 are stabilized at F1 using a phase-locked loop. One of these pulses is selected to seed an amplifier (not shown) that then delivers a frequency-converted (UV) laser pulse to the photocathode at the proper RF phase (F3). A phase shifter in an RF line tunes the relative phase offset.

The timing system 260 may also generate all sample clocks required by real-time servo controls in the optical resonator 245, including optical cavity length and alignment control systems for proper phasing or synchronization between the electron and photon pulses to assure optimal collision efficiency at the interaction point (IP). The highest sampling rate for feedback loops is determined by the ring frequency (~100 MHz). However, by individually stabilizing both the electron ring circulation and the optical cavity length from one master frequency source, F1, only phase drifts need to be adjusted once the proper relative phase is set.

Selection of the pulse length of the electron bunches and photon pulses involves several tradeoffs. Selecting extremely short pulses (e.g., less than one picosecond pulses) facilitates obtaining tight focus of electron bunches and photon pulses and results in the highest peak x-ray output. However, the use of extremely short pulses has the drawback that timing synchronization and control is difficult to achieve using commercially available electronics. Pulse lengths less than about one picosecond require specialized, ultrafast electronics to achieve sub-picosecond synchronization and phasing. Additionally, jitter is a problem when the pulse lengths are less than about one picosecond. In particular, it is difficult to maintain a jitter budget of less than about one picosecond for many commercially available electronic and optical components.

In one embodiment, the electron bunches and photon pulses have pulse lengths from about one picosecond to several tens-of-picoseconds. Using tens-of-picosecond-long electron bunches and photon pulses relaxes the required timing synchronization to similar levels. The absolute timing or phase correction, arising from thermal or mechanical drifts, requires only a slow feedback loop and may be optimized by monitoring x-ray flux. More importantly, longer electron pulses reduce the peak current of the beam which helps reduce the onset of instabilities or other beam dynamics that degrade electron beam quality. The use of longer optical pulses also optimizes storing high power in the high-gain optical cavity by reducing the effect of dispersion (carrier envelope offset) between the mode-locked laser and cavity modes.

The upper limit on the pulse lengths is limited by depth of focus issues, which can reduce the average x-ray flux if the pulse lengths are selected to be greater than several tens of picoseconds. The x-ray flux for a 180 degree backscatter geometry is only weakly sensitive to the length of the electron bunches as long as they are some fraction of the depth of focus, or Rayleigh range. The reduction in intensity is due to the "hourglass effect" which begins to dramatically reduce effective luminosity at bunch lengths beyond the depth of focus. A similar hourglass effect occurs for the photon pulses. The hourglass effect is illustrated in FIG. 3. There are practical limits to the achievable minimum waist sizes for both the electron beam and optical beam. For the electron beam, smaller than 30 micron waists require stronger and more complicated magnets (and more room to put them) that also lead to stronger chromatic effects that affect beam stability. Achieving under 20 micron waists is extremely difficult. For the optical beam, a small waist in a resonant cavity implies working close to an instability point. For practical and achievable waists, the corresponding depth of focus is typically many millimeters long. For a 1 micron laser and a focus of 30 microns (rms), the Rayleigh range is typically about 10 mm, which corresponds to approximately 30 picosecond long laser pulses and electron bunches.

In one embodiment, jitter timing budgets are also selected to facilitate recovering optimum electron bunch and photon pulse timing after each refreshment of the electron bunch. Returning again to FIGS. 4A-4C, in the ideal case the new electron bunch 410 would exactly replace the old electron bunch 400 with no change in timing that would reduce the Compton backscattering efficiency at IP 233. However, in a practical system the new electron bunch 410 replaces the old electron bunch 400 nearly synchronously, i.e., within a jitter timing budget that is preferably small enough that jitter in the timing of the electron bunch created by the refreshment process will not deleteriously disrupt the operation of the timing system 260. In particular, it is desirable that the jitter timing budget is small enough that timing system 260 does not have to perform a radical resynchronization of the photon pulse timing after each refreshment of the electron bunch. As an illustrative example, the jitter timing budget may be selected to be less than the temporal length of an electron bunch to reduce the complexity and cost of designing a control system to rapidly recover optimum electron bunch and photon pulse timing after a refreshment of the electron bunch.

Figure 6:
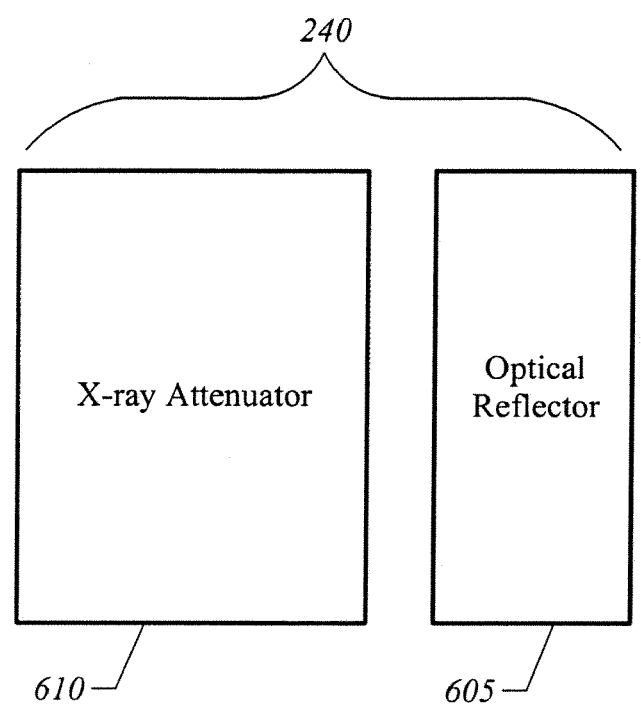
FIG. 6 is a block diagram illustrating functional equivalent elements of a mirror.

FIG. 6 illustrates some of the design issues associated with designing a mirror 240 having low x-ray transmission losses and optical losses in the part-per-million (ppm) range. Mirror 240 can be modeled as having the equivalent functional elements of an optical reflector 605 coupled to an x-ray attenuator 610. Input (incident) x-rays enter and exit x-ray attenuator 610. Incident (input) light strikes optical reflector 605 and reflected light is returned. Increases in the reflectivity of optical reflector 605 increases the optical power stored in optical resonator 245, resulting in an increase in x-ray flux generated by Compton backscattering. However the x-ray transmission losses of mirror 240 must also be taken into account because increases in the x-ray transmission losses of equivalent x-ray attenuator 610 decreases the net x-ray output flux.

The design of mirror 240 thus involves two considerations, namely optimizing optical reflectivity while also minimizing x-ray transmission losses to an acceptable level. For example, one prior art mirror design is to place a hole extending completely through the entire mirror. The hole allows x-rays to pass through the mirror. However, light can also exit through the hole. The hole thus results in the equivalent reflector 605 having a reduced reflectivity (since some of the light also escapes through the hole). To mitigate losses, one may use a higher order optical transverse mode (that has a central null coincident with the hole) in the optical resonator 245. Notwithstanding the more complicated optical matching of the laser to resonator (compared with using the fundamental TEM00 mode), higher order modes have significant losses for practical sized holes for x-ray passage. These additional losses are beyond the ppm levels required for high gain cavities. As such, the use of these high order modes are suitable for only low finesse cavities. Thus, prior art mirror designs are generally unable to simultaneously achieve both a high optical reflectivity and a low x-ray transmission loss.

The x-ray transmission losses of equivalent x-ray attenuator 610 are determined by the x-ray transmission loss though the portion of mirror 240 that the x-rays pass through. Generally speaking, each portion of the mirror of a given length, L, and x-ray attenuation coefficient, $\gamma$, will cause an exponential decrease in x-ray flux of $\exp(-\gamma L)$. The total x-ray transmission loss through the mirror may be calculated by integrating the losses through each portion of the mirror that the x-ray beam passes through.

The reflectivity of equivalent optical reflector 605 is determined largely by the polishing process and optical coatings used to fabricate mirror 240. However, conventional approaches to optimizing mirror reflectivity result in high x-ray losses for a variety of reasons. First, an extremely high reflectivity mirror should be optically continuous over a diameter sufficient that it intercepts substantially all of the optical power of an incoming optical beam (e.g., to achieve a reflectivity of 99.99% requires that the mirror intercept slightly more than 99.99% of the optical power of the incoming beam). This means that in a 180 degree backscattering geometry that to achieve high reflectivity the x-ray beam must pass through the mirror with, in an exact 180 degree geometry, the x-ray beam being coaxial with the center of the optical beam such that the x-ray beam passes through the center of mirror 240, resulting in high x-ray losses.

Additionally, extremely low-loss mirrors (with ppm losses) require extremely low scattering losses. As a result, extremely low loss mirrors typically have the mirror surface polished to a surface roughness of about 1 Angstrom root mean square (rms), what is commonly known in the art as "super-polishing." Super-polishing is typically required to achieve scattering losses on the order of 1 ppm. Super-polished mirror surfaces may be fabricated by commercial vendors, such as Research Electro-Optics of Boulder, Colo. USA. However, a high quality super-polished mirror fabrication process requires a minimum ratio, M, of the diameter, D, relative to an optical substrate thickness, T, of D/T $\leq$ M to provide mechanical support and stability during polishing. A secondary consideration is that D/T must be selected to facilitate mechanical stability of mirror 240 after polishing. If the D/T ratio is too large, mirror 240 may warp after polishing due to residual stress, strain, or heating. Note that even comparatively small deformations (e.g., a fraction of an optical wavelength) may degrade the characteristics of mirror 240. As a result of these polishing and mechanical considerations a conventional super-polished mirror typically requires the mirror surface to be formed on a thick substrate having a corresponding high x-ray transmission loss.

As an illustrative example, a D/T ratio commonly used in the mirror polishing art for high quality polishing of spherical mirrors with sub-Angstrom surface roughness is 5:1, i.e., the substrate thickness should be at least about 20% of the diameter of the substrate to facilitate high quality polishing. Thus, in an implementation in which D is comparatively large the thickness, T, must also increase, which correspondingly increases x-ray losses. As an illustrative example, if D is 50 millimeters, T would conventionally have to be at least 10 millimeters to be compliant with 5:1 polishing rule for high quality polishing. However, a substrate thickness of several millimeters results in high x-ray losses for conventional substrate materials capable of being super-polished, such as a silicon substrate.

Figure 7:
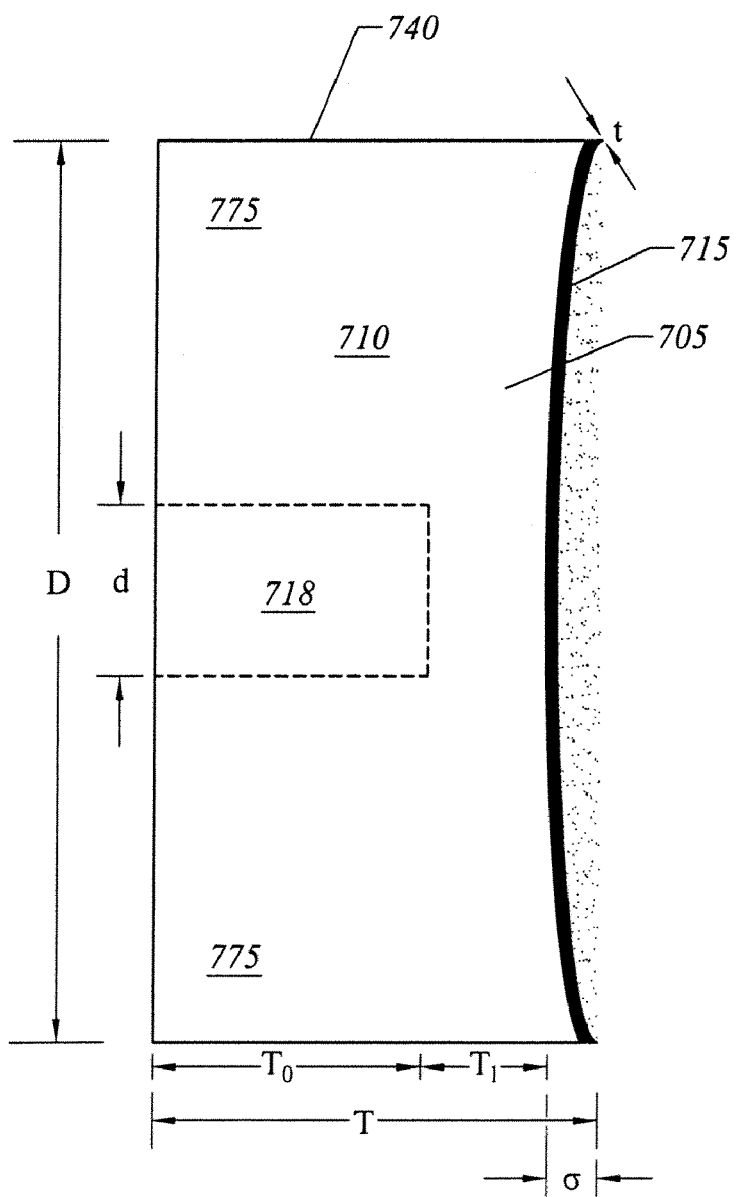
FIG. 7 is a side profile of a mirror reflective to light and transmissive to x-rays in accordance with one embodiment of the present invention.

FIG. 7 is a side view of a mirror 740 for reflecting light and transmitting x-rays with reduced x-ray transmission losses according to one embodiment of the present invention. Mirror 740 may be used in place of mirror 240 to improve x-ray flux output of a 180 degree Compton backscattering system. Mirror 740 has a mirror surface 705 formed in a supporting substrate 710. Mirror surface 705 has an optically reflective coating 715 formed on it with an average thickness, t. Optically reflective coating 715 has a high reflectivity at a selected optical wavelength range and a low optical loss. One criterion for low mirror loss is that the mirror surface 705 must be continuous and extend over substantially all of the optical profile at the mirror plane, i.e., it cannot have any holes and it must extend to a diameter, D, sufficient to intercept substantially all of the power of the optical beam striking mirror 740.

A low optical loss mirror 740 also requires polishing the mirror to within tight tolerances. The surface figure, which is the deviation of the mirror surface 705 from an ideal contour, is preferably less than a tenth of a wavelength. Additionally, residual defects must also be comparatively low. For example, the surface quality is at least 10-5, and preferably 5-2, in a conventional scratch-dig test. A dig is a defect on a polished optical surface that is nearly equal in terms of its length and width. A scratch is a defect on a polished optical surface whose length is many times its width. The nomenclature 10-5 indicates the average diameter of the digs to be 0.05 mm and the average length of a scratch is 0.10 mm.

Substrate 710 has an associated x-ray loss attenuation coefficient per unit distance. As is well known, materials with a high atomic-Z number typically have high x-ray attenuation coefficients. X-ray attenuation is thus reduced by selecting comparatively low-Z materials. Consequently substrate 710 is preferably formed from one or more low-Z materials. One possibility is low-Z metals, such as aluminum, titanium, or beryllium. However, some low-Z materials, such as Beryllium, are difficult to polish to sub-Angstrom rms surface roughness. Beryllium, for example, is both mechanically too soft and too toxic to be a desirable substrate material. Silicon, diamond, and sapphire are stiff low-Z substrate materials with comparatively low x-ray attenuation coefficients. Additionally, techniques to super polish sapphire and silicon are well-developed in the polishing art. Hybrid low-Z multi-layer substrates, such as sapphire-on-silicon and diamond-on-silicon, are also possible substrate choices to achieve a structure with a surface layer capable of being super-polished (e.g., silicon) on top of a base layer providing desirable mechanical and thermal properties (e.g., diamond).

Additionally, optical coating 715 has an associated average x-ray attenuation coefficient per unit distance. In one embodiment, optical coating 715 is a multi-layer dielectric stack coating, such as a stack of alternating quarter-wavelength thick high and low index materials. In a quarter-wavelength stack each layer has a physical thickness of $\lambda_0/4n$, where $\lambda_0$ is the free-space wavelength and n is the refractive index.

The dielectric materials of optical coating 715 are preferably selected to reduce x-ray losses. In particular there is a correlation between the atomic Z value and the index of refraction such that higher index dielectric materials tend to have higher x-ray attenuation. Low index materials, such as silica ($SiO_2$) or Alumina ($Al_2O_3$) tend to be low-Z materials with low x-ray attenuation. However, high index materials formed from high-Z metallic oxides, such as Tantalum ($Ta_2O_5$) or Hafnium ($HaO_2$) tend to have K-edge x-ray absorption edges within common desired x-ray energies of 6 to 18 keV. As is well known in the art of optics, the reflectivity of a multi-layer dielectric stack of quarter-wavelength layers increases with the number of layers in the stack. Thus, to achieve an extremely high reflectivity, such as a reflectivity of 0.9999, would conventionally require a substantial number of layers. If one or both of the layers in the dielectric stack are formed from high-Z materials the total x-ray attenuation can be substantial. Consequently, in one embodiment, a dielectric stack is formed from a quarter wavelength stack of two materials that are each selected to have a comparatively low x-ray attenuation over a broad energy range, such as a dielectric stack of $TiO_2/SiO_2$ which is acceptable for 6 keV and higher x-rays, or over a selected range of x-ray energies, such as $Nb_2O_5/SiO_2$ which is acceptable for x-ray energies of 6 to 18 keV. In one embodiment the dielectric layer stack is chosen to have a total x-ray loss no greater than 10%. As an illustrative example, a stack of thirty-two $TiO_2/SiO_2$ layers, each a quarter wavelength thick for a free-space optical wavelength of 1.06 microns, has a reflectivity of at least 0.9999 and a total x-ray transmission loss at 12 keV of only 4.03%. Thus, with such a dielectric stack the light impinging on the mirror is reflected whereas the dielectric stack is highly transmissive to x-rays.

The total (net) x-ray flux from a 180 degree Compton backscattering system increases with increasing reflectivity of mirror 740 (due to the capability to develop a higher optical power level at the interaction point 233) but is also reduced by x-ray transmission losses in mirror 240. As previously described, optical coating 715 is transmissive to x-rays with the appropriate selection of materials and total thickness (e.g., x-ray transmission losses less than 10%). However, x-ray transmission losses in substrate 710 can still be substantial. In a 180 degree Compton backscattering geometry the x-ray flux passes through optical coating 715 and then into and through substrate 710. To a first order approximation, the total average distance that the x-ray passes through substrate 710 is the substrate thickness, T. A more accurate approximation, however, is to average the x-ray flux over substrate 710 to take into account small deviations in thickness caused by the curvature of mirror surface 705. For example, at the center of mirror surface 705 the mirror curvature results in a small decrease in thickness, δ.

As previously described, in one embodiment the optical resonator is designed to increase the optical mode waist at the mirrors. While the x-rays generated by Compton backscattering will increase in diameter with distance from IP 233, typically the diameter of the x-ray cone at an exit mirror will be only a small fraction of the diameter of the exit mirror. In one embodiment an x-ray aperture region 718 having low x-ray transmission loss is formed within a body portion 775 of mirror 740. The x-ray aperture region 718 is transmissive to x-rays with a maximum pre-selected x-ray transmission loss. For example, in one embodiment the total x-ray transmission losses of x-rays passing through the optical coating 715 and the x-ray aperture region 718 is selected to be no greater than 50%.

As illustrated by phantom lines, in one embodiment x-ray aperture region 718 is a region in which the mirror has a reduced thickness. For example, in one embodiment a cavity within substrate 710 having a diameter, d, is formed that is larger than an x-ray beam diameter at an exit mirror 740 and with a depth T0 relative to a back surface selected so that the residual (average) effective thickness that the x-ray beam passes through mirror 740 is reduced in x-ray aperture region 718 to a thickness T1 (offset by any mirror curvature) selected to achieve a desired maximum x-ray transmission loss. As a result, the x-ray transmission losses are reduced compared with a substrate of uniform thickness T0. X-ray aperture region 718 may be formed using a variety of fabrication processes, such as etching a cavity prior to mirror polishing or etching a cavity after mirror polishing.

Mirror 740 preferably has the values of D and d selected to optimize optical reflectivity and x-ray transmissivity for a particular optical mode waist size at the mirror and a particular x-ray beam diameter. Note that the thicker portions of body portion 775 provide mechanical support for the comparatively thin mirror section in x-ray aperture region 718. The mechanical support provided by the thicker portions of body portion 775 permits the thickness of x-ray aperture region 718 in a diameter, d, to be thinner than that that could be achieved if body portion 775 had a uniform thickness across the entire diameter D. For a given substrate material, conventional modeling techniques may be used to analyze particular combinations of D, d, T, T0, and T1 for a particular set of optical and x-ray beam parameters. For example, mechanical and thermal modeling may be performed to determine ranges with acceptable mechanical characteristics of the mirror surface proximate x-ray aperture region 718. This may include, for example, analyzing mechanical stability, stress, strain, deformation, and thermal effects for particular selections of D, d, T, T0, and T1. The effect of optical heating of mirror 740 from optical absorption may also be modeled. The modeling may include analyzing different substrate materials. The effect of cavity diameter, d, relative to mirror diameter D, may also be modeled to determine an optimum ratio that provides desired mechanical properties. Additionally, the modeling may include analyzing substrates having a uniform composition or substrates formed from different layers. Empirical studies may be used to further select an optimum mirror design for a particular application that is compatible with a high quality mirror fabrication process and that has a combination of a low total x-ray transmission loss and acceptable mirror characteristics. While x-ray aperture region 718 may be created by forming an empty cavity in body portion 775, more generally it will be understood that a cavity may also be partially filled if desired to increase mechanical stability. For example, if x-ray aperture 718 has a comparatively large diameter it may be desirable to provide additional support within an associated cavity, such as support struts, a thin cap region, a low x-ray absorption material, or other features to provide additional mechanical stability in regions of body 775 having a reduced thickness.

Figure 8:
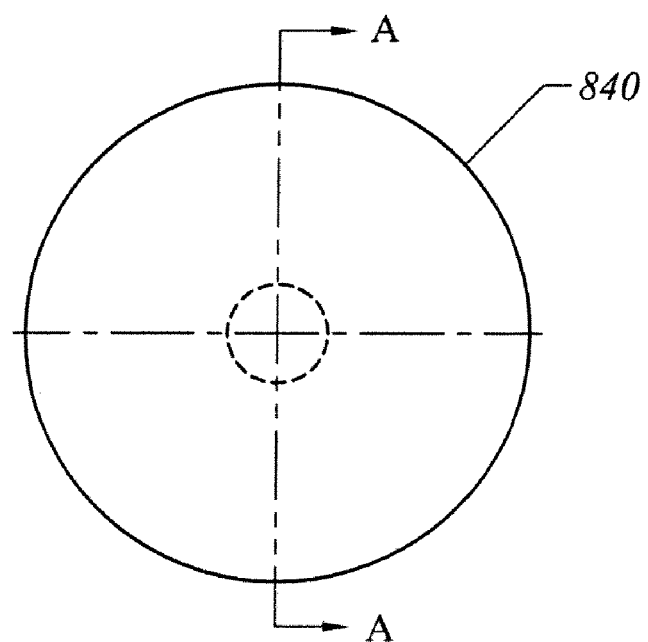
FIG. 8 is a top view of a mirror reflective to light and transmissive to x-rays in accordance with one embodiment of the present invention.
Figure 9:
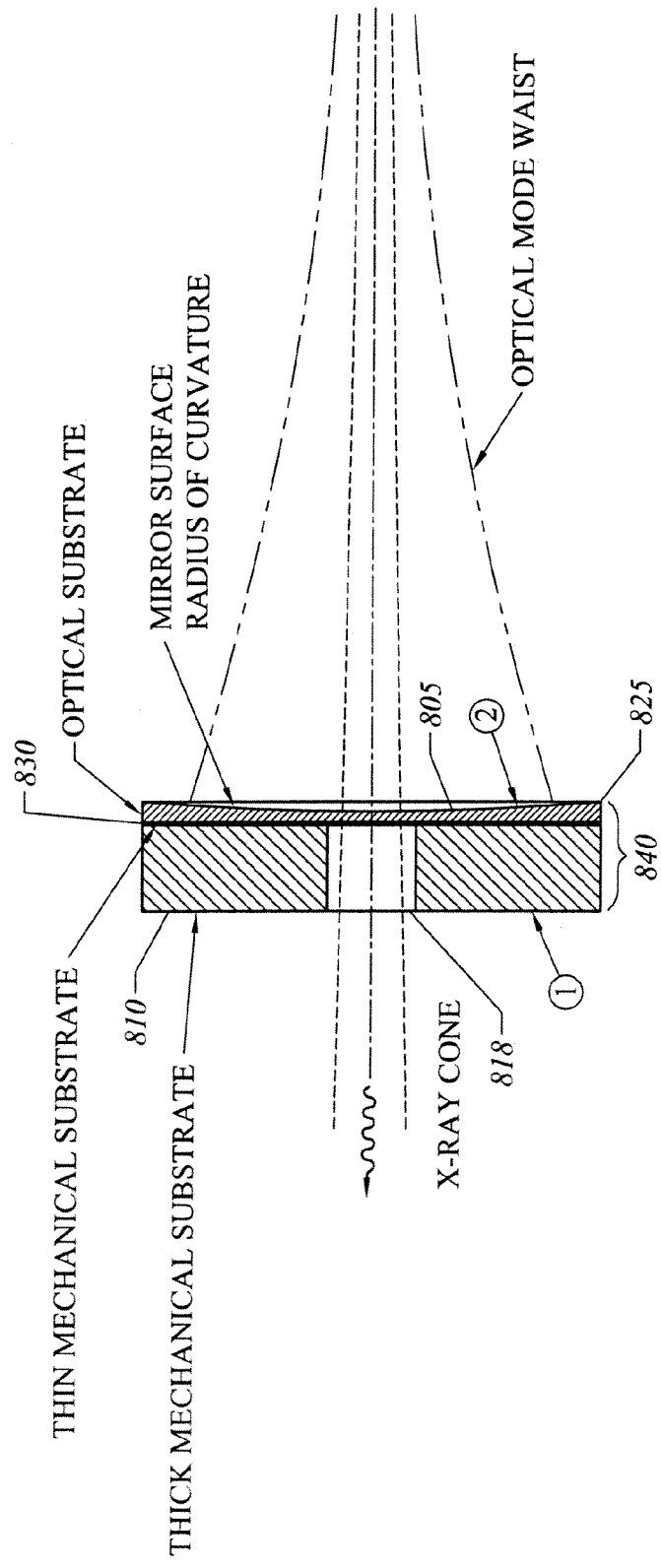
FIG. 9 is a cross-sectional view of the mirror of FIG. 8 along line A-A.

FIG. 8 is a top view of a mirror 840 having reduced x-ray absorption in accordance with one embodiment of the present invention. FIG. 9 is a cross-sectional view along line A-A. A first portion 1 of mirror 840 comprises a thick mechanical substrate 810 that includes a cavity 818 extending through the entire thickness of thick mechanical substrate 810 to form an x-ray aperture. A second portion 2 of optical mirror 840 includes an optical substrate 825 having a mirror surface 805 polished with a selected radius of curvature. Second portion 2 may also include a thin mechanical substrate 830 disposed between thick mechanical substrate 810 and optical substrate 825. A multi-layer stack reflector (not illustrated in FIG. 9) is formed on mirror surface 805. As illustrated by phantom lines, an optical mode having an optical mode waist strikes mirror surface 805. An x-ray cone passes through cavity 818.

Figure 10:
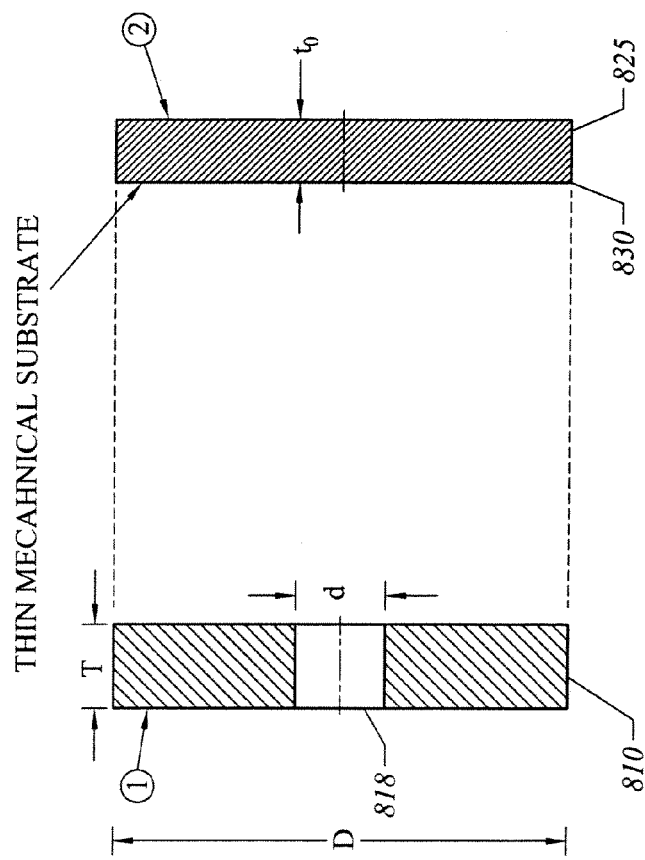
FIG. 10 is an exploded cross-sectional view illustrating a portion of the fabrication process of the mirror of FIG. 8.

FIG. 10 is an exploded view illustrating a fabrication process for forming mirror 840. A first portion 1 comprises thick substrate 810 of diameter D and thickness T having a D/T ratio selected to provide mechanical support for mirror polishing. For example, the thickness, T, may be several millimeters. A D/T ratio of D/T <5 is desirable for minimizing surface figure errors in a super-polishing process. D is determined by the size of the optical beam waist at the mirror surface. As is well known, a lateral optical mode in an optical resonator has a beam waist and a small amount of optical power in a region outside of the waist that decreases rapidly with distance. The mirror diameter is thus preferably larger than the optical waist, w, by a margin selected to achieve a desired optical loss. For example, calculations indicate that to have a mirror loss of less than 5 ppm that the mirror should have a diameter related to the mode waist, w, of at least 2.5 w and preferably 3 w. A clear aperture hole having a diameter d is fabricated into substrate 810 to create cavity 818. The ratio of d is preferably much less than D. In one embodiment the d:D ratio is 1:5. Thick substrate 810 is preferably an optical quality substrate with good mechanical stiffness and thermal stability, such as a silicon substrate. The thick substrate is preferably optically polished plano-flat on both of its sides.

Second portion 2 comprises optical substrate 825 having a starting thickness of to selected to accommodate material losses during polishing. The backside of optical substrate 825 may be coated or bonded to stiffer material for mechanical support, such as a thin mechanical layer 830 of chemical vapor deposited diamond. For example, in one embodiment thin mechanical layer 830 is a diamond layer of 100-200 microns thickness deposited onto an optical substrate 825 that is a silicon substrate. A thin mechanical layer 830 fabricated from a diamond film improves the mechanical strength and thermal heat dissipation of the portion of optical substrate 825 that it supports.

The first portion 1 and the second portion 2 are then bonded together. As one example, silicate bonding may be used to bond the first portion to the second portion. Silicate bonding processes utilize silicate based bonding chemistry to bond two materials together, such as silicon and silicon dioxide materials. A silicate bonding process provides a low-stress interface that has high strength, low interface bonding stress, and is also compatible with use of the mirror in an ultra-high vacuum system. Silicate bonding processes are typically formed on surfaces composes of silicon and/or oxides of silicon, such as silicon or silicon dioxide surfaces. In the case that the first portion and the second portion are both silicon substrates, the silicate bonding may be directly performed on the substrates. However, a thin silicon dioxide layer, such as a silicon dioxide layer of about one micron in thickness, may be deposited on a mechanical substrate 830 to facilitate silicate bonding. This permits a mechanical substrate 830 comprised of a diamond film to be bonded to a thick substrate 810 comprised of silicon.

After substrate bonding the optical substrate 825 is polished to form a high quality optical mirror surface having a desired contour (e.g., a spherical or parabolic mirror surface) and with a pre-selected residual minimum thickness proximate the x-ray aperture. The residual minimum thickness of optical substrate 825 is determined by the trade-off of mechanical support and x-ray transmissivity. For the case that the optical substrate 825 is composed of silicon and the thin mechanical layer 830 is composed of diamond, exemplary design ranges include 10 to 100 microns residual minimum thickness of the silicon layer and 50 to 200 microns for the diamond layer. As illustrative examples for 12 keV x-rays, the combined transmission losses for a 25 micron silicon layer on top of 200 microns of diamond is 18% while a 10 micron layer of silicon on top of 100 microns of diamond is 8%. The layer thicknesses and compositions of the optical substrate layer and the mechanical support substrate may be selected to permit the polishing of a nearly perfect spherical surface. However, it is also possible to utilize a second stage of polishing to correct minor distortions in the mirror about the x-ray aperture. Small surface figure distortions on the order of up to a few microns may be partially or completely ameliorated by a second optical differential polishing technique, such as magnetorheological finishing.

After polishing of the mirror surface is complete, a dielectric multilayer mirror coating is deposited on the polished mirror surface. The multilayer mirror coating may be deposited with conventional coating techniques, such as ion-beam deposition. As previously described, the composition and thickness of the multilayer stack is preferably chosen to achieve a high optical reflectivity and a low x-ray loss.

While mirrors 740 and 840 have been described in regards to applications in Compton backscattering systems, more generally it will be understood that mirrors 740 and 840 may be utilized in other applications as well.

Figure 11:
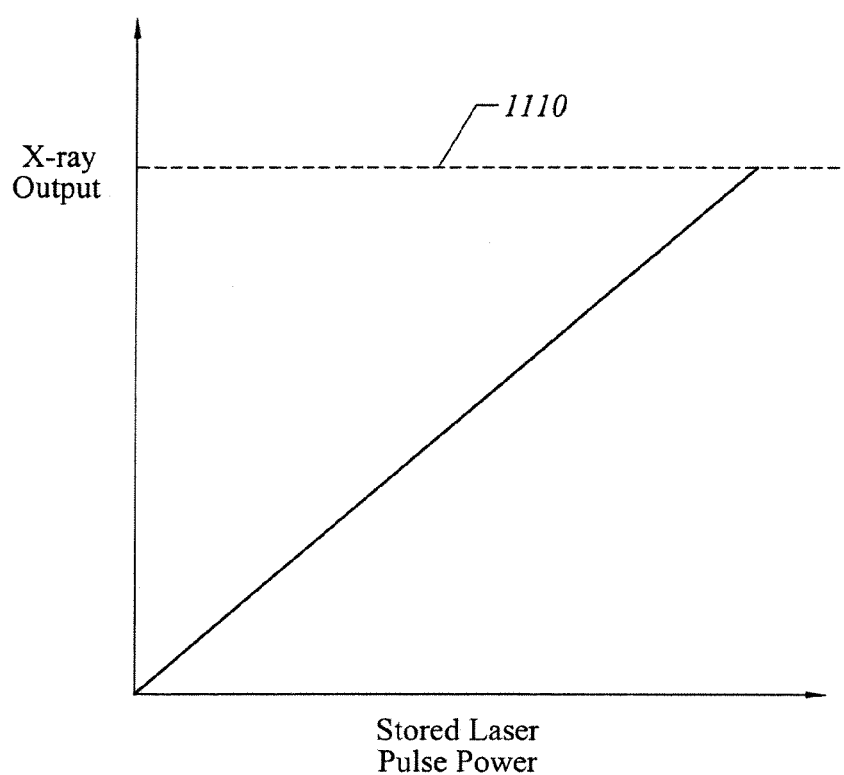
FIG. 11 illustrates x-ray flux output of a Compton synchrotron versus stored laser pulse power.

Referring to FIG. 11, in a Compton x-ray system the x-ray output, for a particular set of electron beam attributes and optical cavity geometry, scales approximately linearly with the stored laser pulse power. The x-ray flux output can be categorized into several different regimes. First, for many applications there is a minimum threshold x-ray flux that is effectively useful for a particular application. Second, there is a preferred minimum x-ray flux (which is higher than the minimum threshold) that is desirable to achieve results comparable to what researchers have achieved in the past with conventional synchrotrons. Studies by the inventors for exemplary electron beam parameters indicate that a stored laser pulse power of 10 to 100 kilowatts is sufficient to generate an x-ray flux that is effectively useful in many applications, corresponding to a minimum threshold 1010. For many applications, a synchrotron radiation source must be tunable in energy, highly collimated, and of sufficient intensity to be suitable for a particular application. For example, a stored optical pulse power of 10 to 100 kilowatts is capable of producing an x-ray flux in a Compton backscattering system that is suitable for applications such as macromolecular crystallography, materials scattering, molecular environmental science, near edge x-ray absorption fine structure, phase contrast/diffraction enhanced imaging, polymer scattering, powder diffraction, small angle x-ray scattering, topography, total x-ray reflection fluorescence, x-ray absorption spectroscopy, and x-ray magnetic circular dichroism.

In many applications a Compton backscattering x-ray source with a stored laser pulse power of approximately one megawatt is preferred (and is technically feasible with current technologies) since this would result in a system having an x-ray flux that is comparable in intensity to what researchers are accustomed to using at conventional synchrotrons. A compact Compton backscattering x-ray system 200 with an x-ray flux comparable to a conventional synchrotron would provide researchers and engineers with an alternative to using centralized conventional large-scale synchrotron facilities. However, conventional mode-locked solid state lasers typically have a power output no greater than about one-hundred watts, with ten watts being more common. Consequently, an optical gain enhancement of between about 1000:1 to 10,000:1 is desirable to achieve tens of kilowatts to one megawatt of stored power for common ranges of input laser pulse power. For example, an optical gain enhancement of 10,000:1 and a one-hundred watt pump laser would result in one megawatt of stored laser pulse power in an optical resonator whereas a hundred watt pump laser and an optical gain enhancement of 1,000 would result in a stored laser power of 100 kilowatts. By way of comparison, in many conventional optical applications an optical resonator typically provides an optical gain enhancement of no more than about 100.

As previously described a passive optical resonator 245 with a high finesse may be used to increase the optical pulse power. Optical resonator 245 is passive in that in a preferred embodiment it does not have an active optical gain medium for amplifying light via stimulated emission. Within the passive optical resonator there is an increase in pulse power (i.e., a gain) relative to the input pulse power level due to resonant reflection and superposition of stored pulses. A passive high finesse optical resonator for a Compton backscattering system does not require additional optical elements between the mirrors such there is little or no insertion loss. For example, in some embodiments the only elements that introduce significant optical losses in the optical resonator are the mirrors, which have optical scattering, optical absorption, and transmission losses. In a Compton backscattering system the mirrors can be optimized to store light with minimal light output. For example, each mirror can be designed to intercept substantially all of the power of the transverse mode (i.e., be continuous and have a diameter much larger than the beam mode waist at the mirror) and also have high reflectivity coatings. As a result, each mirror can be designed to have a reflectivity exceeding 0.9999 with optical losses in the ppm range (e.g., less than 100 ppm) such that the finesse of a passive optical resonator for a Compton backscattering system can be extremely high (e.g., greater than 10,000).

Figure 12:
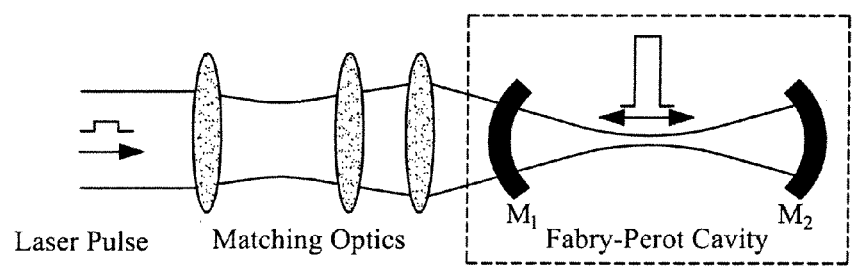
FIG. 12 is a diagram of an optical resonator illustrating aspects of pulse enhancement in a passive cavity via resonant reflections in accordance with one embodiment of the present invention.

The relationship between finesse, pulse gain enhancement, and other optical resonator parameters relevant to a Compton backscattering system may be understood with reference to FIG. 12, which illustrates a resonator receiving a train of laser pulses at a selected repetition rate at a resonant frequency of the optical cavity. The resonator in FIG. 12 is illustrated as a Fabry-Perot resonator although many of the principles of operation are similar for traveling wave resonators, such as bow-tie resonators. A laser pulse entering the Fabry-Perot resonator combines resonantly, in phase, with stored pulses resulting in a gain in pulse power relative to the input pulse power level. The ultimate cavity gain can be described in terms of mirror performance. A basic gain enhancement cavity geometry in a symmetric, two-mirror Fabry-Perot interferometer is that there is a round-trip circulation time equal to the inverse of the laser pulse repetition frequency with a transverse mode determined by the cavity fundamental eigenmode. Under steady-state, matched conditions, the power of the drive laser matches the round-trip losses of the cavity resulting in an amplified circulating laser pulse with a gain ~1/losses. Mirrors M1 and M2 in a resonator can be characterized by their reflectance R, transmissivity T, and losses L where R+T+L=1 by energy conservation. The losses include both scattering and absorptive losses, the latter being less desirable as it can lead to thermal distortions of the mirror surface. In terms of characterizing the performance of an optical cavity, a useful figure of merit is the "bounce number" b that is defined from the round-trip power loss in a cavity, $\alpha\ e^{-1/b}$. The bounce number is just the e-folding decay time, similar to cavity Q, but measured in cavity round-trips. In the limit of small losses, $$b = \frac{1}{T_1 + L_1 + T_2 + L_2},$$

where subscript 1 refers to the input (coupling) mirror. Other propagation losses-like scattering in air or electron beam scattering in vacuum-are typically much smaller (~ppm) than mirror losses. These path losses can simply be added to L1+L2 since, in practice, only the aggregate of non-transmissive losses can be reliably measured. The cavity finesse F, usually defined in terms of reflectivity, is proportional to b and is useful in determining the cavity bandwidth $\Delta v_{cav}$ given the axial-mode interval between resonances, or "free spectral range" FSR, $$F \equiv \frac{\pi \sqrt[4]{R_1 R_2}}{1 - \sqrt{R_1 R_2}} \cong 2\pi b \cong \frac{FSR}{\Delta v_{cav}},$$

where FSR=c/2L, L being the mirror-to-mirror separation distance and c the speed of light. The cavity bandwidth determines the required frequency stabilization of the drive laser for efficient gain enhancement.

The gain, defined as the steady-state cavity pulse energy $U_0$ in units of incident pulse energy $U_{inc}$ is $$\text{gain} \equiv \frac{U_0}{U_{inc}} \cong 4T_1 b^2.$$

The "impedance" match measures how well the incident field cancels the leakage field from the cavity in steady-state and is calculated from the net reflected field $$\frac{\vec{E}_{refl}}{\vec{E}_{inc}} \cong 1 - 2T_1 b,$$

where the square of this term determines the amount of power unable to couple into the cavity. This coupling then places an upper bound on the expected efficiency of the system. In a matched configuration, the input coupling equals the sum of all other losses in the cavity, T1=L1+L2+T2=½b, yielding no net power reflection. From a practical standpoint, the coupling mismatch has a broad minimum since the reflected power varies quadratically with T1 near match.

Note that the free-running noise of the drive laser must be within the optical bandwidth of the cavity in order for the laser's optical pulse train to resonantly build-up power in the external cavity. Thus, a high finesse cavity requires that the drive laser be frequency stabilized to a high degree of precision.

Figure 13:
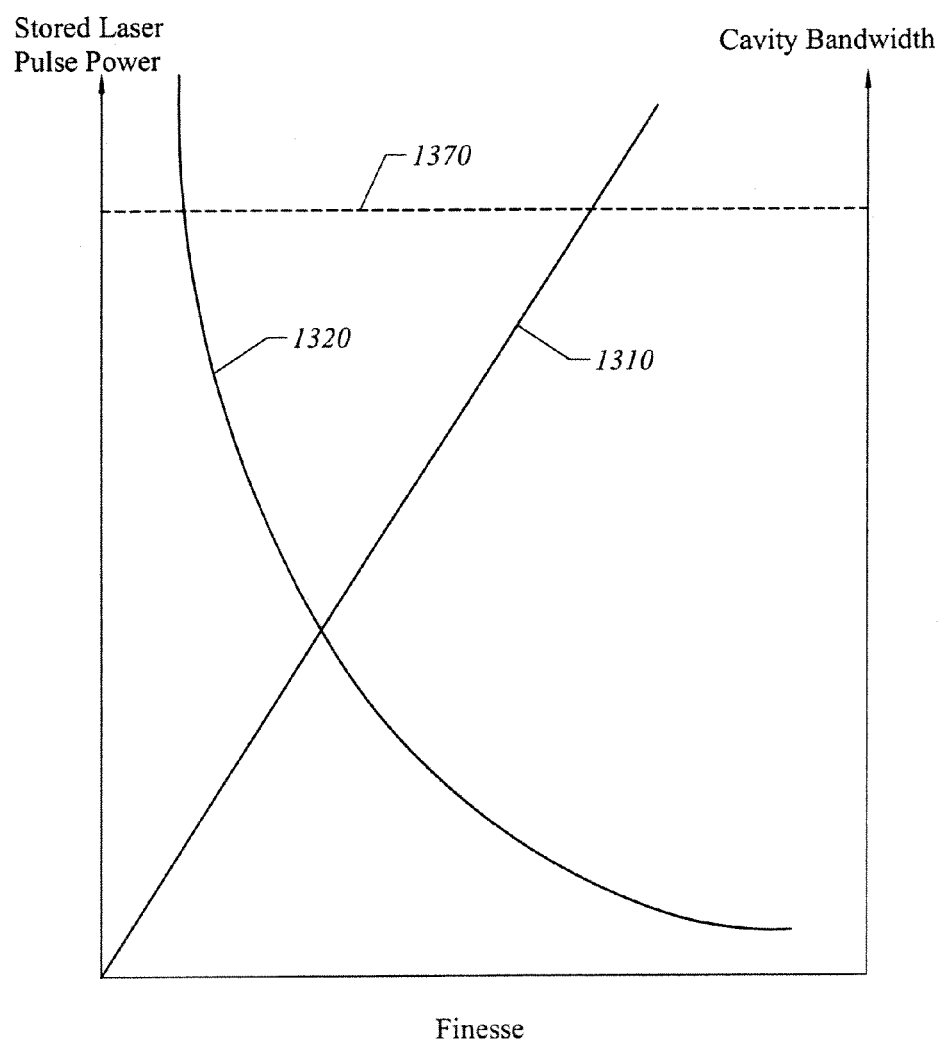
FIG. 13 illustrates the effect of laser resonator finesse versus stored laser pulse power and cavity bandwidth in accordance with one embodiment of the present invention.

Referring to FIG. 13, for a given input pulse power level the stored laser pulse power 1310 scales with finesse whereas the cavity bandwidth 1320 decreases with increasing finesse. As a result to achieve a stored laser pulse power 1370 for generating an x-ray flux comparable to a conventional synchrotron requires a high cavity finesse and correspondingly low cavity bandwidth.

Conventional pulse gain enhancement systems used in the laser art typically have a gain on the order of about 100. However, modeling by the inventors of the present application indicate that gains as least as high as 10,000 are achievable in a Compton backscattering system. This is due, in part, to the fact that prior art pulse gain enhancement systems require the interaction of other elements besides the mirrors that generate insertion losses (e.g. optical modulator switches or harmonic generating crystals) and were consequently unable to obtain high gain due to additive losses or material damage thresholds. In contrast, a cavity designed for a Compton X-ray source does need to have any added insertion losses since the photon beam does not need to be extracted. In particular, a passive optical cavity can be designed in which the optical losses are primarily or solely the mirror losses. The weakly-interacting Compton scattering of electrons in practical terms does not limit the gain performance of the optical system since the interaction losses are low even in comparison to the best achievable mirror losses. Additionally, the optical layout can be optimized to create high peak powers needed for X-ray production while keeping the power densities within damage threshold limits on the mirror surfaces.

As an illustrative example, a designed cavity enhancement of 10,000 requires a total cavity loss, including mirror transmission losses, of 200 ppm of which 100 ppm is ideally the transmission T1. The resulting cavity finesse is 30,000, well below what is achievable with low-loss mirrors. Assuming that a 100 MHz pulse train drives a matched 10,000 gain cavity (having a finesse of 30,000), the corresponding cavity bandwidth is ~3 kHz. The laser necessary to resonantly drive this cavity must be frequency stable to some fraction of the cavity bandwidth, ideally a factor of 10 or so lower, or a few hundred Hz. By way of contrast, this required level of frequency stabilization is approximately a factor of ten lower than for mode-locked lasers used in other applications, such as metrology, where the use of an external microwave reference source limits optical frequency stability.

Frequency stabilization of a mode-locked pulse laser requires an active feedback control system to suppress the laser's free-running frequency noise. The active feedback system is composed of a discriminator error signal (e.g., an error signal preferably based on an optical measure of an attribute of the optical resonator indicative of how far the center frequency of the laser is to the resonant frequency of the optical resonator), which is then conditioned through a compensator circuit and applied back to the laser through an actuator to adjust the center frequency of the laser. Frequency stabilization is required for timing stability to ensure that the electromagnetic fields of the optical pulse envelopes add by superposition.

One limit on the ability to stabilize the frequency of a mode-locked laser is associated with the gain of the feedback system and the Nyquist stability criteria. Well-known control theory states that an active feedback system can suppress free-running noise by the magnitude of the feedback loop gain, and that the noise terms from a sensor, reference, and compensator stages adds with a weighting given by the sensor gain. For these reasons, the performance of a closed-loop feedback system, defined here as the residual frequency noise, is directly related to high open loop gain and low noise, especially at the sensor. A practical limitation on the control system gain is the bandwidth of the control loop. The Nyquist criterion defines gain and phase relations that must be met to insure closed-loop stability, which places limits on the slope of the open-loop gain curve near the unity-gain frequency.

Additionally, there are physical limits on the frequency stabilization of a mode-locked laser. A mode-locked laser generates a pulse train. In the frequency domain, the number of CW modes contributing to the optical pulse train is given by the gain bandwidth—which is inversely proportional to the pulse width—divided by the repetition rate of the laser. For laser pulse widths in the tens of picoseconds operating at repetition rates near 100 MHz, there are typically several hundred modes within the bandwidth of the laser. The modes are uniformly spaced across this band (down to a part $\sim 10^{17}$, but may have a comb offset given by the dispersion within the laser. The lowest achievable linewidth, or spectral bandwidth, of each mode is usually described by the Schawlow-Townes limit and is a measure of the spectral broadening due to quantum noise fluctuations (spontaneous emission). This limit is noticeable in only extremely stable lasers that have sub-Hz linewidths. In practice, the free-running frequency noise of solid-state lasers is dominated rather by "technical noise"—acoustic-mechanical environmental noise coupling to the laser cavity optics or gain media. The optical path length changes induced by this noise is manifested as frequency jitter on the entire mode spectrum.

Figure 14:
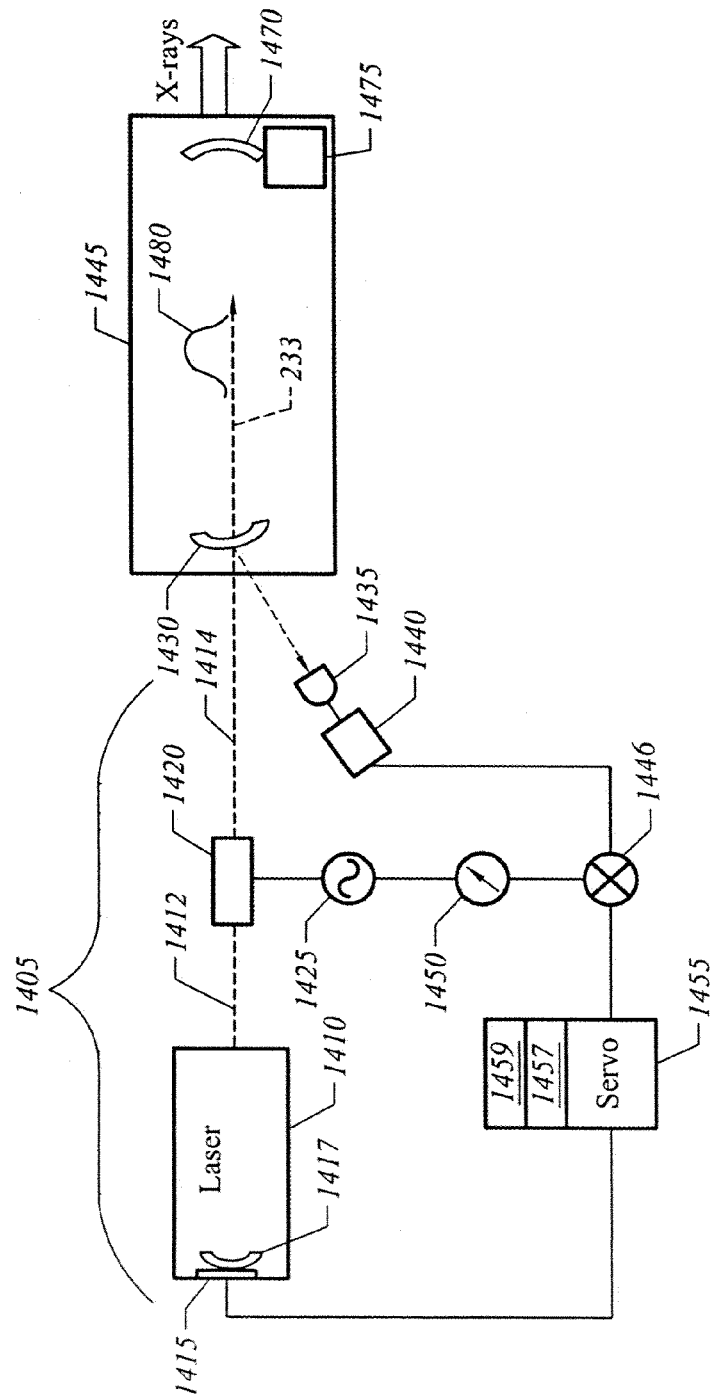
FIG. 14 is a block diagram of a an optical resonator system utilizing FM sideband modulation to match laser frequency to the resonant frequency of the optical resonator in accordance with one embodiment of the present invention.

FIG. 14 illustrates a feedback control system for frequency stabilizing mode-locked laser 1405 to drive a cavity of a high-finesse resonator 1445 very close to the resonant frequency of the high finesse resonator 1445. High finesse resonator 1445 has mirrors 1430 and 1470 forming an optical cavity having an associated optical cavity length. A mode-locked laser 1410 is a CW mode locked laser that produces pulses with a selected repetition rate. The laser pulse repetition rate is made to track some harmonic of the cavity FSR by frequency stabilization feedback monitored on the reflected optical signal from the cavity. An optical attribute of high-finesse resonator 1445 is monitored and used to generate an error signal for adjusting a center frequency of mode-locked laser 1410, where the center frequency may be any frequency, such as the center of a spectral envelope or a peak-power frequency, used as a reference for tuning purposes. An advantage of this approach is that the laser frequency is adjusted relative to the same optical resonator that stores the optical pulses. This results in improved control compared with, for example, attempting to track the laser to a separate external absolute reference frequency.

In one embodiment an FM sideband technique is used to generate an error signal for tracking the wavelength of mode-locked laser 1410 to the resonant frequency of the optical resonator 1445 such that the residual noise is less than the cavity bandwidth of the optical resonator. In this embodiment, the control system includes an electro-optic modulator 1420, detector (photodiode 1435), demodulator (mixer 1446) and controller (servo 1455).

Mode-locked laser 1410 generates a train of optical pulses having an output comb of modes 1412. The output comb of modes 1412 preferably has a fundamental transverse mode TEM00 and passes through an electro-optic modulator 1420 to generate input pulses 1414 that are frequency modulated (FM) modulated signals having an FM sideband that is displaced in frequency from the mode-locked laser comb of frequencies.

The laser profile is conditioned by appropriate lenses (not shown) to match the fundamental eigenmode of laser resonator 1445 and may for example use turn mirrors (not shown) to align the beam to overlap the cavity eigenmode.

Laser 1410 includes a servo-controlled piezo-ceramic actuator 1415 to adjust the laser wavelength to track the resonant frequency of the optical resonator. The laser wavelength may be controlled by adjusting the laser cavity length of mode-locked laser 1410 (e.g., by adjusting a position of laser mirror 1417 via piezo-ceramic actuator 1415). Both the mirror 1417 and piezo-ceramic actuator 1415 are preferably physically small and lightweight in order to keep mechanical resonances high (>100 kHz). Electro-optic modulator 1420 is driven by an rf source 1425 at a frequency preferably in the range of 1 to 20 MHz. The frequency is chosen in this band to minimize noise in the detection process; it should be higher than the optical bandwidth of optical resonator 1445 yet lower than some fraction of the repetition rate of the laser to assure sampling uniformity. The depth of modulation may be chosen to optimize signal strength vs. efficiency, typically resulting in a reduction of the main optical carrier power between 1% to 20%.

The laser beam then enters the cavity of optical resonator 1445, typically either through an optical coupler such as a brewster-angle coupler inside the cavity or through a transmissive mirror 1430. The laser light may pass through other optical elements such as lenses to adjust the transverse profile of the beam so that it couples well to an eigenmode of optical resonator 1445.

Laser light at the FM sideband frequency is reflected from mirror 1430 due to the difference between the FM sideband frequency and the resonant frequency. Additionally, some power in the cavity mode may also exit through mirror 1430. Thus, photodiode 1435 receives light at the FM sideband frequency and light at the cavity mode frequency of the optical resonator 1445. These two signals are optically mixed on the photodiode 1435 and produce a set of modulated frequencies containing information about the frequency deviation of the laser to that of the optical resonator. A passive filter or amplifier 1440 may help condition the photodiode signal by preferentially passing the modulation frequency. The photodiode signal is then demodulated using the same frequency as the rf source. The demodulation may be done with an analog device, such as a mixer 1446, preferably using the same oscillator with a provision for adjusting the phase 1450. Alternatively, the photodiode signal may be sampled with a fast digitizer and directly demodulated, for instance with DSP technology. The demodulation produces a signed error signal proportional to the frequency deviation of the laser to that of the cavity over a frequency range given by the bandwidth of the optical resonator 1445.

The error signal may be conditioned by a series of filters and amplifiers in a servo 1455. In one embodiment servo 1455 is implemented as analog blocks using for instance low-noise operational amplifiers. Alternatively, servo 1455 may be implemented digitally and converted to an analog output. Well-known control theory is used to optimize the filter response depending, for example, on the frequency noise spectral density and actuator bandwidth. Preferably, there are at least two servo paths 1457 and 1459 that are implemented sequentially. The first servo path 1457 possesses unconditional stability and is used to acquire a 'lock'
between the laser and the optical resonator. The second servo path 1459 suppresses residual noise after the lock has between acquired.

Transient signals or other dynamics are thus minimized as the free-running laser frequency matches the cavity resonance. The second servo 1459 is a boost servo that boosts the low frequency gain, where the dominant acousto-mechanical noise terms exist, but makes the feedback only conditionally stable. The boost servo is stable, however, once the laser is tracking the cavity and can dramatically reduce the integrated residual noise.

In a Compton x-ray backscattering system input optical pulses 1414 are increased in power in optical resonator 1445 due to resonant reflection. Thus, as previously described a circulating pulse 1480 in optical resonator 1445 may have a power level that is enhanced by a large factor compared with input optical pulses 1414. One of the mirrors 1470 preferably has an actuator 1475 to permit a fine adjustment of the cavity length. The adjustment of the cavity length permits circulating optical pulse 1480 to be synchronized to be at interaction point 233 for collision with an electron bunch. Thus, in an exemplary embodiment the timing system 260 provides timing signals for controlling the repetition rate of laser 1410. Fine adjustment of the timing of circulating optical pulse 1480 may be achieved by adjusting the cavity length of optical resonator 1445 via actuator 1475. Frequency stabilized laser 1405 uses optical resonator 1445 as its reference and adjusts it laser frequency to track the resonant frequency of optical resonator 1445.

FM sideband modulation has been used to suppress the free-running frequency noise of continuous wave (cw) lasers. However, the published frequency stability of cw lasers has approached no better than ~10 kHz. Experimental data by the inventors has demonstrated that a high-power mode-locked laser can be stabilized to <100 Hz of a resonance frequency of a high-finesse resonator having an optical bandwidth of 6-10 kHz. By way of contrast, these results are approximately an order of magnitude better than conventional prior art techniques to stabilize femtosecond mode-locked laser using an external microwave source. In extremely short-pulse mode-locked lasers the laser is typically stabilized to an external source providing an absolute frequency reference. In contrast, in the present invention the mode-locked laser is stabilized in frequency relative to the resonant frequency of the optical resonator used to store optical pulses.

Figure 15:
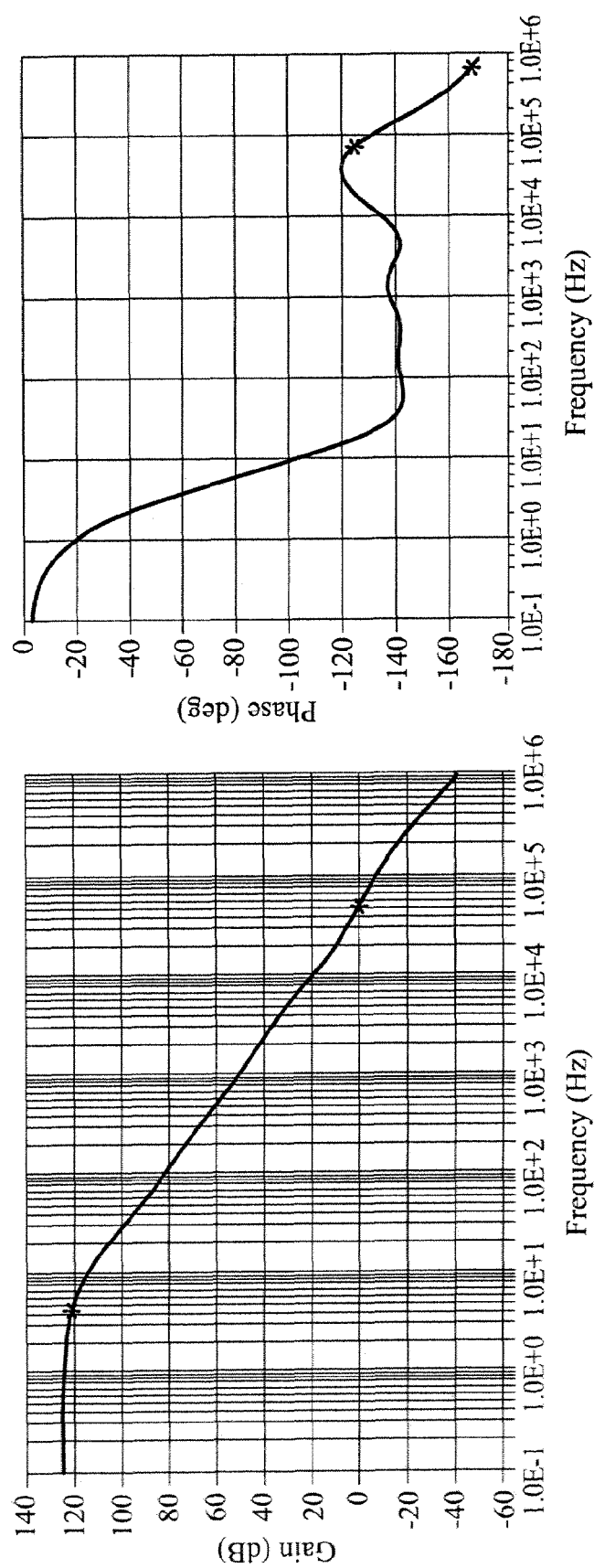
FIG. 15 are empirical gain and phase plots versus frequency for a first servo path of the system of FIG. 14 in accordance with one embodiment of the present invention.

Stabilizing a laser to less than 100 Hz requires selecting a laser that has intrinsic frequency stability. Since the mode-locked laser free-running frequency noise is dominated by acoustic and mechanical noise sources, the experimental mode-locked laser had a compact laser cavity design manufactured with stiff, non-adjustable mounting to reduce mechanical resonances. Vibration sources such as fans were replaced by water cooling plates. One laser cavity mirror was replaced by a small optic, a high reflector of dimension 5×5×2 mm which was glued to a similarly sized piezo-ceramic actuator. Such a combination has measured mechanical resonances above 100 kHz and sets the practical limit of the feedback servo bandwidth. The feedback servo consists of analog gain and filter stages. The main servo loop has a unity-gain frequency adjusted below 100 kHz and designed to be unconditionally stable with a phase margin of >35 degrees. The main servo loop is responsible for acquiring the initial lock between the resonant frequency of the optical resonator and the laser frequency. FIG. 15 is a transfer function of gain and phase versus frequency for the main servo 1457 implemented in analog circuitry.

Figure 16:
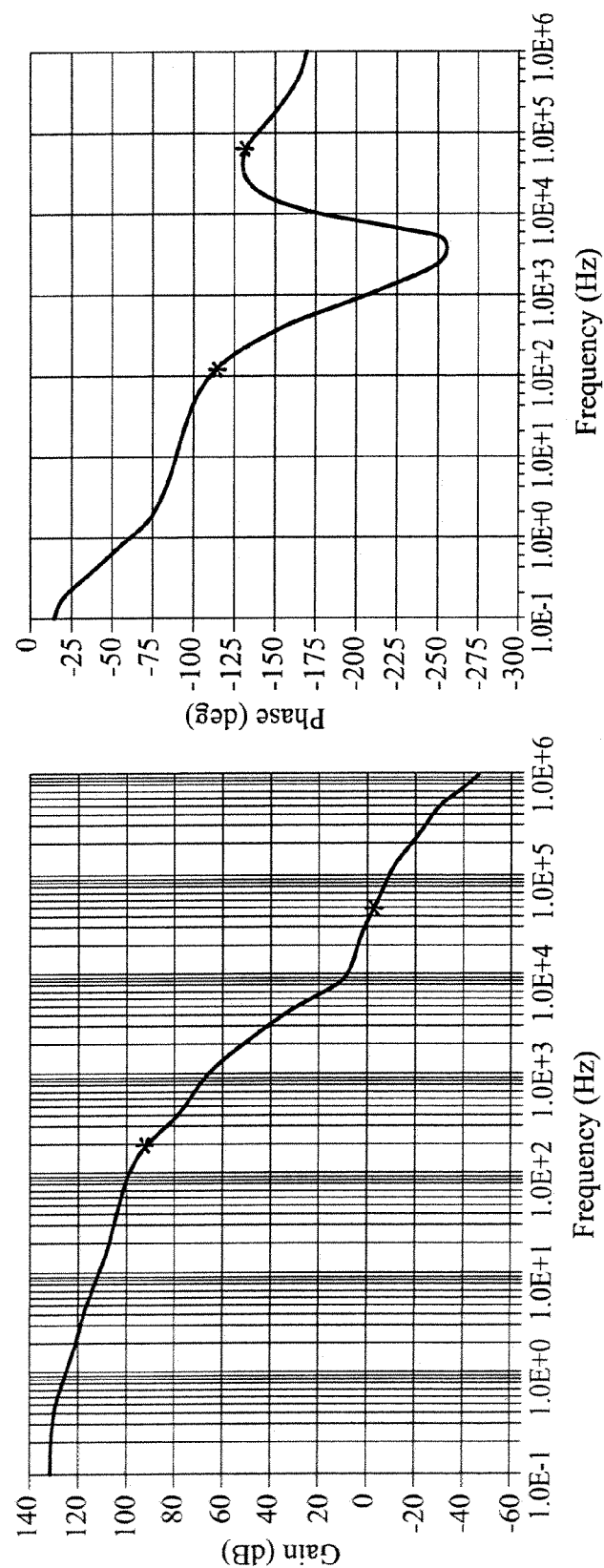
FIG. 16 are empirical gain and phase plots versus frequency for a first and second servo path of the system of FIG. 14 in accordance with one embodiment of the present invention.

FIG. 16 is a transfer function of gain and phase versus frequency for a main servo 1457 plus a parallel boost servo 1459. In one embodiment a secondary servo path then engages a set of parallel gain and filter stages to suppress the large amplitude, low frequency noise further. The resulting transfer function of FIG. 16 for steady-state operation must obey the well-known Nyquist stability criteria for steady state operation.

As previously described, in one embodiment of the present invention the mode-locked laser pulse length is comparatively large, e.g., greater than one picosecond and preferably greater than ten picoseconds. Utilizing comparatively long picosecond pulses facilitates optical storage of pulses in a passive optical resonator because of the reduced effects of optical dispersion. By way of contrast, if sub-picosecond pulses were used dispersive effects would need to be compensated for in order to effectively couple light to a high finesse optical resonator. As a figure of merit, dispersion becomes important when the carrier to envelope offset (CEO), or phase slip per pulse ($-\lambda/2<CEO<\lambda/2$) accumulates to an offset comparable to the optical pulse envelope over the characteristic storage time of the cavity pulses (which is proportional to finesse). For example, a 10,000 gain cavity storing a one micron wavelength optical pulse could circulate approximately 10,000×0.5 microns=5 millimeter long pulses, which corresponds to a 15 ps pulse. Shorter pulse widths or higher gain cavities would require dispersion compensation in order to avoid incurring a significant reduction in stored optical power.

It is also desirable that the transverse optical mode of the laser resonator be stable. As previously described, in one embodiment optical resonator 245 is a traveling wave resonator. A bow-tie resonator is a preferred traveling wave resonator because it is compact and has comparatively few mirrors for a traveling wave resonator. A passive bowtie resonator is robust to misalignment instabilities. Such a traveling-wave resonator has two distinct advantages over a standing wave Fabry-Perot resonator in regards to mode stability: first, the round-trip phase advance of the cavity mode is further from integer and half-integer resonance conditions for a given waist size criteria which greatly improves transverse stability; second, a round-trip phase advance near a half-integer resonance rather than a (standing-wave) integer resonance avoids many low-order (dipole) alignment instabilities. The disadvantage to a bow tie resonator compared with a Fabry-Perot resonator is that there are more mirror reflections, hence losses, per cavity round-trip in a bow-tie resonator which may diminish overall cavity gain.

Figure 17:
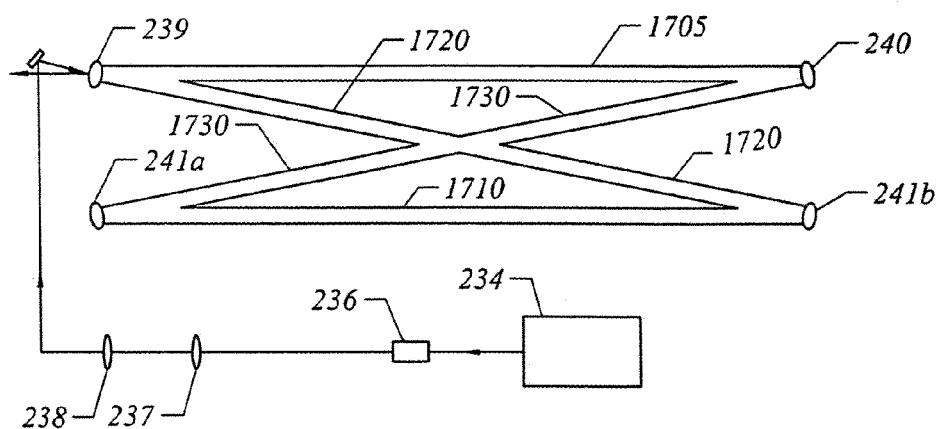
FIG. 17 is a diagram of an optical resonator having a bow-tie configuration.
Figure 18:
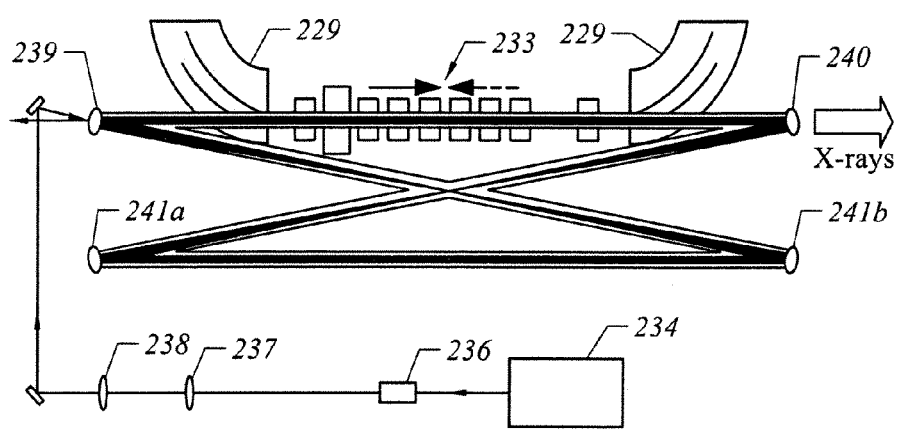
FIG. 18 is a diagram of the optical resonator of FIG. 17 with a portion of an electron storage ring superimposed to illustrate the interaction point and with variations in transverse mode optical mode illustrated.

FIGS. 17 and 18 illustrates a preferred layout for an optical cavity designed as a passive bowtie resonator for a backscattered Compton X-ray source. FIG. 17 illustrates the bowtie resonator in isolation for the purposes of illustration whereas FIG. 18 illustrates the passive bowtie geometry and a section of the electron storage ring proximate the bowtie resonator. The shaded portions within the optical resonator in FIG. 18 illustrate variations in transverse mode size in the resonator, which increases proximate the mirrors.

Referring to FIG. 17, the bowtie resonator configuration is a traveling wave resonator having four mirrors defining two longitudinal optical paths 1705, 1710 and two diagonal optical paths 1720, 1730 between mirrors. The bowtie resonator geometry affords several unique advantages. Referring to FIG. 18, first, a narrow optical waist is created at a central interaction point 233 where an opposing electron beam is likewise transversely focused. The mirrors 239, 240 on each side of the waist are separated by a large distance in order to substantially increase the beam size on the mirrors which lowers the optical power per unit area or risk of damage. In one embodiment, the ratio of transverse beam size between the mirrors and the waist is approximately 100:1 which leads to a reduction in power density on the order of 10000:1 for an axially symmetric TEM00 mode. The large distance between mirrors is also advantageous to steer an electron beam in to and out of the interaction point 233 using dipole magnets 229 such that the collision may occur at an optimal 180 degree backscattered geometry. A natural consequence of this geometry is that generated X-rays will follow a path coincident with the electron path trajectory at the interaction point 233 and consequently be directed toward and through one optical mirror 240. The design of this mirror must therefore allow X-rays to pass with little attenuation. The other mirrors 239, 241a, 241b form a ring cavity containing two more deep waists and one shallow waist on the opposite arm from the interaction point.

A bow tie cavity geometry provides more transverse stability than a simple two-mirror Fabry-Perot cavity. In particular, a predominantly 3-waist ring cavity is much less sensitive to lowest-order errors or instabilities associated with alignment than any standing-wave cavity design. A Fabry-Perot cavity having a small waist and large spots on the mirrors works near an integer or Pi resonance. This resonance is characteristic of all standing wave cavities and is particularly sensitive to dipole mode errors, such as transverse vibrations of optical mounts. A conventional Fabry-Perot cavity would need fast feedback mechanisms to maintain stability for cavities designed to have small interaction waists. In contrast, a bow-tie cavity has stable optical solutions near both Pi mode and Pi/2 modes. In particular, working near a Pi/2 or half-integer resonance makes the cavity mode qualitatively less sensitive to dipole errors (and higher order even mode errors). Dipole errors significantly amplify alignment sensitivity and may lead to instability as dipole terms are the most common source of errors arising from typical mechanical or acoustic vibration in the cavity of an optical resonator.

It may be understood from the previous description that an optical resonator for a Compton backscattering system may be designed that provides improved pulse storage in a high finesse cavity capable of providing significant increases in pulse power (e.g., a factor of 10,000 in one example), has comparatively few optical components, is compatible with a 180 degree Compton backscattering geometry, and is compatible with storing pulse power on the order of one megawatt. Additionally, an improved frequency stabilization system provides improved stability of a mode-locked laser frequency relative to a resonant frequency of an optical resonator. While these embodiments are of interest for a Compton backscattering system, it will be understood that they have applications as subsystems in other types of optical systems.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus for storing optical pulses in an optical resonator as a superposition of pulses, comprising:
   a mode-locked laser generating optical pulses comprising a comb of frequencies within a frequency range, said mode-locked laser having a selectable center frequency of said optical pulses;
   an FM sideband modulator receiving said optical pulses and generating input pulses for said optical resonator having an FM sideband frequency relative to said center frequency;
   a detector for receiving reflected laser light at said FM sideband frequency and stored light exiting said optical resonator at a cavity frequency; and
   a controller monitoring deviations of said center frequency from a resonant frequency of said optical resonator and in response adjusting said center frequency to match said resonant frequency within a selected margin less than a cavity bandwidth of said optical resonator;
   wherein said controller includes a first servo path for obtaining an initial lock to said center frequency and a second servo path for reducing residual noise.

2. The apparatus of claim 1, wherein said optical resonator has a finesse selected to increase the power of said input optical pulses by a factor of at least 1,000 via superposition of stored optical pulses.

3. An apparatus for storing optical pulses in an optical resonator as a superposition of pulses, comprising:
   a mode-locked laser generating optical pulses comprising a comb of frequencies within a frequency range, said mode-locked laser having a selectable center frequency of said optical pulses;
   an FM sideband modulator receiving said optical pulses and generating input pulses for said optical resonator having an FM sideband frequency relative to said center frequency;
   a detector for receiving reflected laser light at said FM sideband frequency and stored light exiting said optical resonator at a cavity frequency; and
   a controller monitoring deviations of said center frequency from a resonant frequency of said optical resonator and in response adjusting said center frequency to match said resonant frequency within a selected margin less than a cavity bandwidth of said optical resonator;
   wherein said optical resonator has a finesse selected to increase the power of said input optical pulses by a factor of at least 10,000 via superposition of stored optical pulses and has a corresponding cavity bandwidth no greater than about 3 KHz.

4. The apparatus of claim 3, wherein said center frequency is stabilized to less than about 300 Hz.

5. An apparatus for storing optical pulses in an optical resonator as a superposition of pulses, comprising:
   a mode-locked laser generating optical pulses comprising a comb of frequencies within a frequency range, said mode-locked laser having a selectable center frequency of said optical pulses;
   an FM sideband modulator receiving said optical pulses and generating input pulses for said optical resonator having an FM sideband frequency relative to said center frequency;
   a detector for receiving reflected laser light at said FM sideband frequency and stored light exiting said optical resonator at a cavity frequency; and
   a controller monitoring deviations of said center frequency from a resonant frequency of said optical resonator and in response adjusting said center frequency to match said resonant frequency within a selected margin less than a cavity bandwidth of said optical resonator;
   wherein a pulse length of said optical pulses is selected to be greater than a pulse length for which dispersive effects significantly reduces coupling and storage of pulses in said optical resonator.

6. The apparatus of claim 5, wherein said pulse length is greater than one picosecond.

7. The apparatus of claim 5, wherein said controller comprises a demodulator to demodulate signals received from said detector and a servo.

8. A Compton backscattering x-ray system, comprising:
   a high finesse optical resonator for storing optical pulses and increasing pulse power via resonant superposition of optical pulses within said high finesse optical resonator;
   a mode-locked laser generating a train of optical pulses coupled to said high finesse optical resonator, said train of optical pulses having a repetition rate, a center frequency, and a comb of frequencies;
   a control system monitoring an optical attribute of said optical resonator indicative of a difference between said center frequency and a resonant frequency of said high finesse optical resonator, said control system regulating said center frequency to be within a cavity bandwidth of said high finesse optical resonator wherein said control system comprises a first servo path for obtaining an initial lock to said center frequency and a second servo path for reducing residual noise.

9. The system of claim 8, wherein said control system comprises a frequency modulated (FM) sideband modulator modulating said train of optical pulses to have an FM sideband, said control system detecting reflected light at said FM sideband and light coupled out of said optical resonator, generating an error signal indicative of a deviation of said center frequency from said resonant frequency, and determining a correction to said center frequency.

10. The system of claim 8, wherein said optical resonator has a finesse selected to increase the power of said optical pulses by a factor of at least 1,000 via superposition of stored optical pulses.

11. A Compton backscattering x-ray system, comprising:
   a high finesse optical resonator for storing optical pulses and increasing pulse power via resonant superposition of optical pulses within said high finesse optical resonator;
   a mode-locked laser generating a train of optical pulses coupled to said high finesse optical resonator, said train of optical pulses having a repetition rate, a center frequency, and a comb of frequencies;
   a control system monitoring an optical attribute of said optical resonator indicative of a difference between said center frequency and a resonant frequency of said high finesse optical resonator, said control system regulating said center frequency to be within a cavity bandwidth of said high finesse optical resonator;
   wherein said high finesse resonator has a cavity bandwidth of no more than 3 KHz and wherein said center frequency is stabilized to less than about 300 Hz.

12. A Compton backscattering x-ray system, comprising:
high finesse optical resonator for storing optical pulses and and increasing pulse power via resonant superposition of optical pulses within said finesse optical resonator;
a mode-locked laser generating a train of optical pulses coupled to said high finesse optical resonator, said train of optical pulses having a repetition rate, a center frequency, and a comb of frequencies;
a control system monitoring an optical attribute of said optical resonator indicative of a difference between said center frequency and a resonant frequency of said high finesse optical resonator, said control system regulating said center frequency to be within a cavity bandwidth of said high finesse optical resonator;
wherein a pulse length of said optical pulses is selected to be greater than a pulse length for which dispersive effects would significantly reduce coupling and storage of pulses in said optical resonator.

13. The system of claim 12, wherein said pulse length is greater than one picosecond.

14. The system of claim 12, wherein said control system comprises a demodulator to demodulate signals received from said detector and a servo.

15. The system of claim 12, further comprising: a cavity length adjuster to adjust a cavity length of said optical resonator to synchronize timing of optical pulses within said optical resonator to electron beam bunches at an interaction point.

16. A Compton backscattering x-ray system, comprising:
a high finesse optical resonator for storing optical pulses as a superposition of pulses and having an optical path coaxial with a portion of an electron storage ring for 180 degree Compton backscattering of stored optical pulses with electron bunches;
a mode-locked laser generating optical pulses coupled to said high-finesse optical resonator, said optical pulses comprising a comb of frequencies within a frequency range, said mode-locked laser having a selectable center frequency of said optical pulses;
a control system monitoring an optical attribute of said high finesse optical resonator indicative of a difference between said center frequency and a resonant frequency of said high finesse optical resonator, said control system regulating said center frequency to be within a cavity bandwidth of said high finesse optical resonator;
wherein said high finesse optical resonator provides an optical gain enhancement of at least a factor of one thousand of said optical pulses generated by said mode-locked laser;
wherein said control system comprises an frequency modulated (FM) sideband modulator modulating said train of optical pulses to have a FM sideband, said control system detecting reflected light at said FM sideband and light coupled out of said optical resonator, generating an error signal indicative of a deviation of said center frequency from said resonant frequency, and determining a correction to said center frequency;
wherein said control system includes a first servo path for obtaining an initial lock to said center frequency and a second servo path for reducing residual noise.

17. A Compton backscattering x-ray system, comprising:
a high finesse optical resonator for storing optical pulses as a superposition of pulses and having an optical path coaxial with a portion of an electron storage ring for 180 degree Compton backscattering of stored optical pulses with electron bunches;
a mode-locked laser generating optical pulses coupled to said high-finesse optical resonator, said optical pulses comprising a comb of frequencies within a frequency range, said mode-locked laser having a selectable center frequency of said optical pulses;
a control system monitoring an optical attribute of said high finesse optical resonator indicative of a difference between said center frequency and a resonant frequency of said high finesse optical resonator, said control system regulating said center frequency to be within a cavity bandwidth of said high finesse optical resonator;
wherein said high finesse optical resonator provides an optical gain enhancement of at least a factor of one thousand of said optical pulses generated by said mode-locked laser;
wherein said control system comprises an frequency modulated (FM) sideband modulator modulating said train of optical pulses to have a FM sideband, said control system detecting reflected light at said FM sideband and light coupled out of said optical resonator, generating an error signal indicative of a deviation of said center frequency from said resonant frequency, and determining a correction to said center frequency;
wherein said optical resonator has a finesse selected to increase the power of said input optical pulses by a factor of at least 10,000 via superposition of stored optical pulses and has a corresponding cavity bandwidth no greater than about 3 KHz.

18. The system of claim 17, wherein said center frequency is stabilized to less than about 300 Hz.

19. The system of claim 17, further comprising: a cavity length adjuster to adjust a cavity length of said optical resonator to synchronize timing of optical pulses within said optical resonator to electron beam bunches at an interaction point.

20. The system of claim 8, wherein said high finesse optical resonator has a portion of an optical path coaxial with a portion of an electron storage ring for 180 degree Compton backscattering of stored optical pulses with electron bunches.

21. The system of claim 9, wherein said high finesse optical resonator has a portion of an optical path coaxial with a portion of an electron storage ring for 180 degree Compton backscattering o stored optical pulses with electron bunches.

22. The system of claim 10, wherein said high finesse optical resonator has a portion of an optical path coaxial with a portion of an electron storage ring for 180 degree Compton backscattering of stored optical pulses with electron bunches.

23. The system of claim 11, wherein said high finesse optical resonator has a portion of an optical path coaxial with a portion of an electron storage ring for 180 degree Compton backscattering of stored optical pulses with electron bunches.

24. The system of claim 12, wherein said high finesse optical resonator has a portion of an optical path coaxial with a portion of an electron storage ring for 180 degree Compton backscattering of stored optical pulses with electron bunches.

25. The system of claim 13, wherein said high finesse optical resonator has a portion of an optical path coaxial with a portion of an electron storage ring for 180 degree Compton backscattering of stored optical pulses with electron bunches.

26. The system of claim 14, wherein said high finesse optical resonator has a portion of an optical path coaxial with a portion of an electron storage ring for 180 degree Compton backscattering of stored optical pulses with electron bunches.

27. The system of claim 15, wherein said high finesse optical resonator has a portion of an optical path coaxial with a portion of an electron storage ring for 180 degree Compton backscattering of stored optical pulses with electron bunches.

* * * * *